(12) United States Patent
Ohki et al.

(10) Patent No.: US 6,615,354 B1
(45) Date of Patent: *Sep. 2, 2003

(54) INFORMATION PROCESSING EQUIPMENT

(75) Inventors: Masaru Ohki, Tokorozawa (JP);
Yasuko Fukuzawa, Yokohama (JP);
Susumu Okuhara, Yokohama (JP);
Masahiro Kaminaga, Sakado (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,995

(22) Filed: Mar. 20, 2000

Related U.S. Application Data

(63) Continuation of application No. 09/458,018, filed on Dec. 10, 1999.

(30) Foreign Application Priority Data

Dec. 14, 1998 (JP) .......................................... 10-354156

(51) Int. Cl.[7] ....................... H01L 21/82; H01L 21/822; H01L 27/04
(52) U.S. Cl. ....................... 713/193; 713/194; 713/340; 380/46; 380/37; 380/50; 380/51; 380/52
(58) Field of Search ................................ 713/193–194, 713/340; 380/37, 50–52, 46, 1, 28–30

(56) References Cited

U.S. PATENT DOCUMENTS

| | | | | |
|---|---|---|---|---|
| 3,798,360 A | * | 3/1974 | Feistel ........................... | 178/23 |
| 4,932,053 A | | 6/1990 | Fruhauf et al. | |
| 5,341,423 A | * | 8/1994 | Nossen ........................... | 380/6 |
| 5,724,428 A | * | 3/1998 | Rivest ........................... | 380/37 |
| 5,727,062 A | * | 3/1998 | Ritter ........................... | 380/37 |
| 5,745,577 A | * | 4/1998 | Leech ........................... | 380/28 |
| 5,995,629 A | * | 11/1999 | Reiner ........................... | 380/50 |
| 6,185,304 B1 | * | 2/2001 | Coppersmith et al. .......... | 380/7 |
| 2002/0124178 A1 | * | 9/2002 | Kocher et al. .............. | 713/193 |

FOREIGN PATENT DOCUMENTS

| | | | |
|---|---|---|---|
| EP | 0 448 262 | 9/1991 | |
| EP | 0 720 098 | 7/1996 | |
| EP | WO 02/23312 A1 | * 3/2002 | ............. G06F/1/00 |
| EP | WO 02/50641 A1 | * 6/2002 | ............. G06F/1/00 |
| FR | 2 745 924 | 9/1997 | |
| JP | 200124414 A | * 9/2001 | ........... H01L/27/04 |

OTHER PUBLICATIONS

X. Zhu and H. M. Heys, The Analysis of a new class of Unbalanced CAST Cipher, Faculty of Engineering and Applied Science Memorial University of Newfoundland, St. John's Newfoundland , Canada, 1997.*

Thomas S. Messerges and Ezzy A. Dabbish, USENIX, The Advanced Computing Systems Association, Investigations of Pow Analyusis Attacks on Smartcards. Published in the USENIX Workshop on smartcard Technology, Chicago, USA, 1999.*

"Smart Card Handbook", John Willey & Sons, W. Rankl et al, p. 263.

* cited by examiner

*Primary Examiner*—Gail Hayes
*Assistant Examiner*—Taghi T. Arani
(74) *Attorney, Agent, or Firm*—Mattingly, Stanger & Malur, P.C.

(57) ABSTRACT

A relation between the data process contents in an IC card chip and the consumption current of the IC card chip is reduced. Prior to executing an input data process of the IC card chip, the input data is transformed to thereby reduce the relation between the process data and the consumption current of the IC card chip. After the transforming process, the transformed data is untransformed to obtain a correct process result.

18 Claims, 24 Drawing Sheets

FIG. 25

| | 0 | 1 | 2 | 3 | | 15 |
|---|---|---|---|---|---|---|
| 0 | 14 | 4 | 13 | 1 | | 7 |
| 1 | 0 | 15 | 7 | 4 | | 8 |
| 2 | 4 | 1 | 14 | 8 | | 0 |
| 3 | 15 | 12 | 8 | 2 | | 13 |

| | 0 | 1 | 2 | 3 | | 15 |
|---|---|---|---|---|---|---|
| 0 | 9 | 3 | 10 | 6 | | 0 |
| 1 | 7 | 8 | 0 | 3 | | 15 |
| 2 | 3 | 6 | 9 | 15 | | 7 |
| 3 | 8 | 11 | 15 | 5 | | 10 |

2601, 2602, 2603, 2604, 2605, 2606

XOR 7 TO THE TABLE IN FIGURE 25

FIG. 27

| 2701 | | | | 2706 | | 2703 |
|---|---|---|---|---|---|---|
|  | 9 | 8 | 11 | 20 |  | 6 |
| 2 | 9 | 3 | 10 | 6 |  | 0 |
| 3 | 7 | 8 | 0 | 3 |  | 15 |
| 0 | 3 | 6 | 9 | 15 |  | 7 |
| 1 | 8 | 11 | 15 | 5 |  | 10 |

2705, 2702, 2704

XOR 2 AND 9 TO THE LINE AND COLUMN IN THE TABLE IN FIGURE 26 RESPECTIVELY

FIG. 28

|   | 1 | 2 | 3 | 4 | 5 | 6 |
|---|---|---|---|---|---|---|
| 1 | 32 | 1 | 2 | 3 | 4 | 5 |
| 2 | 4 | 5 | 6 | 7 | 8 | 9 |
| 3 | 8 | 9 | 10 | 11 | 12 | 13 |
| 4 | 12 | 13 | 14 | 15 | 16 | 17 |
| 5 | 16 | 17 | 18 | 19 | 20 | 21 |
| 6 | 20 | 21 | 22 | 23 | 24 | 25 |
| 7 | 24 | 25 | 26 | 27 | 28 | 29 |
| 8 | 28 | 29 | 30 | 31 | 32 | 1 |

FIG. 29

| 16 | 7 | 20 | 21 |
|---|---|---|---|
| 29 | 12 | 28 | 17 |
| 1 | 15 | 23 | 26 |
| 5 | 18 | 31 | 10 |
| 2 | 8 | 21 | 14 |
| 32 | 27 | 3 | 9 |
| 19 | 13 | 30 | 6 |
| 22 | 11 | 4 | 25 |

|   | 0 | 1 | 2 | 3 |
|---|---|---|---|---|
| 0 | B | 3 | 8 | 7 |
| 1 | 1 | 4 | 0 | D |
| 2 | 2 | F | A | 9 |
| 3 | 6 | C | 5 | E |

|   | 0 | 1 | 2 | 3 |
|---|---|---|---|---|
| 0 | 2 | A | 1 | E |
| 1 | 8 | D | 9 | 4 |
| 2 | B | 6 | 3 | 0 |
| 3 | F | 5 | C | 7 |

3401

|   | 0 | 1 | 2 | 3 |
|---|---|---|---|---|
| 0 | 5 | F | 7 | C |
| 1 | 6 | B | 0 | 3 |
| 2 | D | 8 | 4 | 9 |
| 3 | A | 2 | E | 1 |

| 58 | 50 | 42 | 34 | 26 | 18 | 10 | 2 |
|----|----|----|----|----|----|----|---|
| 60 | 52 | 44 | 36 | 28 | 20 | 12 | 4 |
| 62 | 54 | 46 | 38 | 30 | 22 | 14 | 6 |
| 64 | 56 | 48 | 40 | 32 | 24 | 16 | 8 |
| 57 | 49 | 41 | 33 | 25 | 17 | 9  | 1 |
| 59 | 51 | 43 | 35 | 27 | 19 | 11 | 3 |
| 61 | 53 | 45 | 37 | 29 | 21 | 13 | 5 |
| 63 | 55 | 47 | 39 | 31 | 23 | 15 | 7 |

FIG. 38

| 57 | 49 | 41 | 33 | 25 | 17 | 9  |
|----|----|----|----|----|----|----|
| 1  | 58 | 50 | 42 | 34 | 26 | 18 |
| 10 | 2  | 59 | 51 | 43 | 35 | 27 |
| 19 | 11 | 3  | 60 | 52 | 44 | 36 |
| 63 | 55 | 47 | 39 | 31 | 23 | 15 |
| 7  | 62 | 54 | 46 | 38 | 30 | 22 |
| 14 | 6  | 61 | 53 | 45 | 37 | 29 |
| 21 | 13 | 5  | 28 | 20 | 12 | 4  |

INFORMATION PROCESSING EQUIPMENT

This is a divisional application of U.S. Ser. No. 09/458,018, filed Dec. 10, 1999.

BACKGROUND OF THE INVENTION

The present invention relates to an information processing equipment, and more particularly to an information processing apparatus suitable for a tamper resistance device such as an IC card providing high security.

An IC card is mainly used for storing information in a manner so as not to be altered by a third party or for enciphering data or deciphering a cipher text by using a cipher key which is kept in secret. Since the IC card is not provided with a power source, it becomes operable only when it is inserted into a reader-writer. The IC card receives a command from the reader-writer to execute data transfer.

As shown in FIG. 1, an IC card has the structure that an IC card chip 102 is fabricated on a card 101. A general IC card has contacts via which a power is supplied from a reader-writer and data is transferred.

The structure of an IC card chip is basically the same as that of a microcomputer. As shown in FIG. 2, the IC card chip includes a central processor 201, a storage memory 204, an input/output port 207, and a co-processor 202. The central processor 201 executes logical and arithmetic calculations, and the storage memory 204 stores programs and data. The input/output port 207 communicates with a reader-writer. The co-processor 202 is a special calculation device for executing modular calculations, and is used for calculations in anti-symmetric RSA or the like. Many of IC card processors have no co-processor. A data bus 203 inter-connects components of the IC card.

The storage memory 204 includes a ROM (Read Only Memory), a RAM (Random Access Memory), an EEPROM (Electrically Erasable Programmable Read Only Memory) and the like. ROM is a memory device whose contents cannot be rewritten freely, and is mainly used for storing programs. RAM is a memory whose contents can be rewritten freely and are erased if a power supply is intercepted. When the IC card is disconnected from the reader-writer, a supply of the power is intercepted so that the contents of RAM cannot be retained. EEPROM is a rewritable memory whose contents can be retained even if a power supply is interrupted. Therefore, EEPROM is used for storing data which may be rewritten and can be retained even if the IC card is disconnected from the reader-writer. For example, the number of prepaid times of a prepaid card is stored in EEPROM because it is updated each time the card is used and the contents thereof are required to be retained even if the card is disconnected from the reader-writer.

An IC card is used for storing programs and important information in the IC card chip to execute a cipher process. It has been long considered that the difficulty in decryption of a cipher process executed in the IC card is the same as that in decryption of a ciphering algorithm. However, it has been suggested recently that there is a possibility of presuming the contents of a cipher process and a cipher key by measuring and analyzing a consumption current while the cipher process is executed, easier than decryption of a cipher algorithm. The consumption current can be monitored by measuring the current supplied from the reader-writer. This possible danger is described in "Smart Card Handbook", by W. Rankl & W. Effing, John Willey & Sons, paragraph 8.5.1.1 "Passive protective mechanism", at p. 263.

SUMMARY OF THE INVENTION

CMOSs constituting an IC card chip consume current when an output state changes from "1" to "0" or vice versa. The data bus 203 in particular flows a large current when its state changes from "1" to "0" or vice versa, because the data bus has a large electrical capacitance. This suggests a possibility of presuming the operation state in the IC card chip by monitoring the consumption current.

FIG. 3 shows wave shapes of consumption current during one cycle operation of an IC card chip. Depending upon processed data, the current wave shape becomes different as indicated at 301 and 302. This difference is generated depending upon data on the bus 203 and data being processed by the central processor 201.

Consider now the data transfer on a pre-charge bus of 16 bits. The pre-charge bus is reset prior to data transfer so that all bits on the bus have a value "0". If the data having the same number of "1" bits and different values, e.g., data of hexadecimal "88" and "11" both having two "1" bits, is transferred to this bus, the current wave shapes are generally the same. This is because the numbers of bits changing from "0" to "1" are the same and the same current is consumed to have similar current wave shapes. If the data having a difference of one "1" bit, e.g., data of hexadecimal "89" and "19" both having three "1" bits, is transferred to this bus, the current wave shape becomes different from that of the data having two "1" bits. This is because the number of bits changing from "0" to "1" changes to three bits and a corresponding current is consumed increasingly. Therefore, as compared to the data having two "1" bits, the consumption current increases in amount corresponding to one bit. There is a regularity that the larger the number of "1" bits, the larger the amplitude of the current wave shape becomes. From this regularity, the transferred data can be presumed.

The current wave shapes shown in FIG. 3 indicate the total sum of current flowing not only through the bus but also through other components constituting the IC card chip. A microcomputer such as an IC card chip includes a phase during which data is transferred mainly to the bus, a phase during which a CPU operates mainly, a phase during which data is written in a register, and other phases. If the phases are taken into account, it is possible to know by which component a difference between consumption currents was mainly produced, and the data process at the component can be presumed.

A difference between consumption currents will be described by using as an example the following left shift instruction.

$$\text{shift1 } R1 \tag{1}$$

This instruction shifts the contents of the register R1 to the left, i.e., shifts the bit train in the register to the left, and the value of the most significant bit is entered in a condition code register as a carry. Since the most significant bit in the register R1 is transferred via the data bus to the condition code register, whether the most significant bit is "0" or "1" can be possibly discriminated by comparing the amplitudes of current wave shapes. If important data is stored in the register R1, there is a possibility of discriminating whether this data is "0" or "1" although the data is only one bit. The cryptographic process, particularly DES, frequently uses an operation of shifting a cipher key. During this shift operation, the current wave shape allowing to presume the data of the cipher key is generated so that there is a possibility that the cipher key is presumed.

The above-described case is also applied to the operation of the co-processor 202. If the operation contents include any unbalance dependent upon a cipher key, this shift can be presumed from the consumption current, and there is a possibility that the cipher key is presumed.

An issue associated with the present invention is to reduce the relation between the data process in an IC card chip and its consumption current. If the relation between the data process in an IC card chip and its consumption current can be reduced, it becomes difficult to presume the data process in the IC card chip and the cipher key, from the observed consumption current shapes. The feature of this invention is to make difficult to presume the data process and the cipher key from the consumption current wave shape, by processing the data in the IC card chip after it is transformed.

The tamper resistance device, typically an IC card chip, is considered as an information processing equipment which comprises: a storage memory including a program storage unit for storing a program and a data storage unit for storing data; and a central processing unit for executing a data process in accordance with the program, the program including one or more data process means each being a process instruction for giving an execution instruction to the central processing unit. According to the invention, as the method of reducing the relation between the data process in an IC card chip and its consumption current, data is first transformed by using disturbance data and then processed. After this process, the data is untransformed by using the disturbance data to obtain a correct process result. The disturbance data to be used after the data process may be the same disturbance data used for the data process, if necessary. The disturbance data is changed randomly at each data process. With these processes, during each data process, transformed data can be used without using the original data. It becomes therefore difficult to presume the data from current wave shapes.

Specifically, disturbance data Xi is first generated and the data D1 is transformed by using the disturbance data Xi to generate transformed data H1. The transforming method may be exclusive logical OR, addition, multiplication or the like. During the data process, the transformed data H1 is processed to generate processed and transformed data H2. Since the transformed data H1 is used instead of original data D1, it is difficult to presume the data D1 from the current wave shapes during the process of the transformed data H1. Since the transformed data is generated by using different disturbance data Xi at each process, the transformed data generated at each process is different. Therefore, the current wave shape during the process of the transformed data H1 becomes different at each process. Presuming the transformed data H1 from current wave shapes is therefore meaningless.

If it is necessary for the disturbance data Xi to be processed in a manner similar to the data D1, the disturbance data Xi is processed to generate processed disturbance data. The processed and transformed data H1 is processed by using the processed disturbance data Xo to generate the processed data D2 which is a result of the input data process for the input data D1.

If it is necessary to use different data transformation methods, it may be required to connect several data transformations. In such a case, a combination of a data transforming process, a transformed data process, a disturbance data process, and a data untransforming process is used and these several data transformations are connected so as not to process original data.

According to this invention, it is possible to conceal the information that may be gotten in the permutation process and substitution process for replacing data and in the access process to data tables, during execution of an encryption algorithm. The transformation process that ensures to get the correct data is one of effective methods to be used for data encryption and decryption. In this transformation process, the exclusive logical OR is used to transform data in a data exchanging process, and the transformed data and disturbance data are processed by the same method in the data process.

The typical structure of the invention is as follows. An information processing equipment comprising: a storage memory including a program storage unit for storing a program and a data storage unit for storing data; a central processing unit for executing a data process in accordance with the program, the program including one or more data process means each being a process instruction for giving an execution instruction to the central processing unit; and input data processing means wherein one data processing means processes input data and outputs the processed data, comprises: data transforming process means for transforming input data D1 by using disturbance data Xi to generate transformed data H1; transformed data processing means for executing an operation process OP1 for the transformed data H1 in place of the operation process OP1 for the input data D1 to be executed by the input data processing means, to generate processed and transformed data H2; disturbance data processing means for executing the operation process OP1 for the disturbance data Xi to generate processed disturbance data Xo; and data untransforming processing means for executing an operation process OP2 for the processed and transformed data H2 by using the processed disturbance data Xo, to generate processed data D2 which is a result of the operation process OP1 for the input data D1.

The operation process OP1 corresponds, for example, to the process of an embodiment illustrated in FIG. 4 to be described later. The operation process OP1 corresponds, for example, to the process for disturbance data 2 (510 to 513, and 516 to 520).

BRIEF DESCRIPTION OF THE DRAWINGS

FIG. 25 is an i-th S box table, according to an embodiment of the invention.

FIG. 26 is a table having transformed data of the i-th S box table of the embodiment.

FIG. 27 is a table having transformed positions of the i-th S box table of the embodiment.

FIG. 28 is a selectable permutation E table, according to an embodiment of the invention.

FIG. 29 is a permutation P table, according to an embodiment of the invention.

FIG. 33 shows an example of an original table according to an embodiment of the invention.

FIG. 34 shows a table whose contents are modified from those of the table shown in FIG. 33, according to the embodiment of the invention.

FIG. 37 is an IP permutation table according to an embodiment of the invention.

FIG. 38 is a PC-1 selectable permutation table according to an embodiment of the invention.

DETAILED DESCRIPTION OF THE EMBODIMENTS

Embodiments of the invention will be described with reference to the accompanying drawings.

Figure 1:
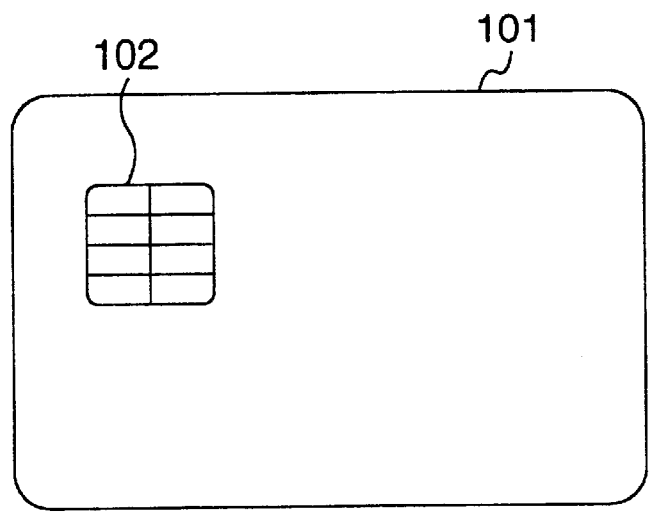
FIG. 1 is a diagram showing an example of the structure of hardware of a known IC card.

FIG. 1 is a plain view of an IC card. The position of an IC card chip 102 and the number of contacts and their operation assignments of the IC card 101 are defined by ISO 7816 specifications.

Figure 2:
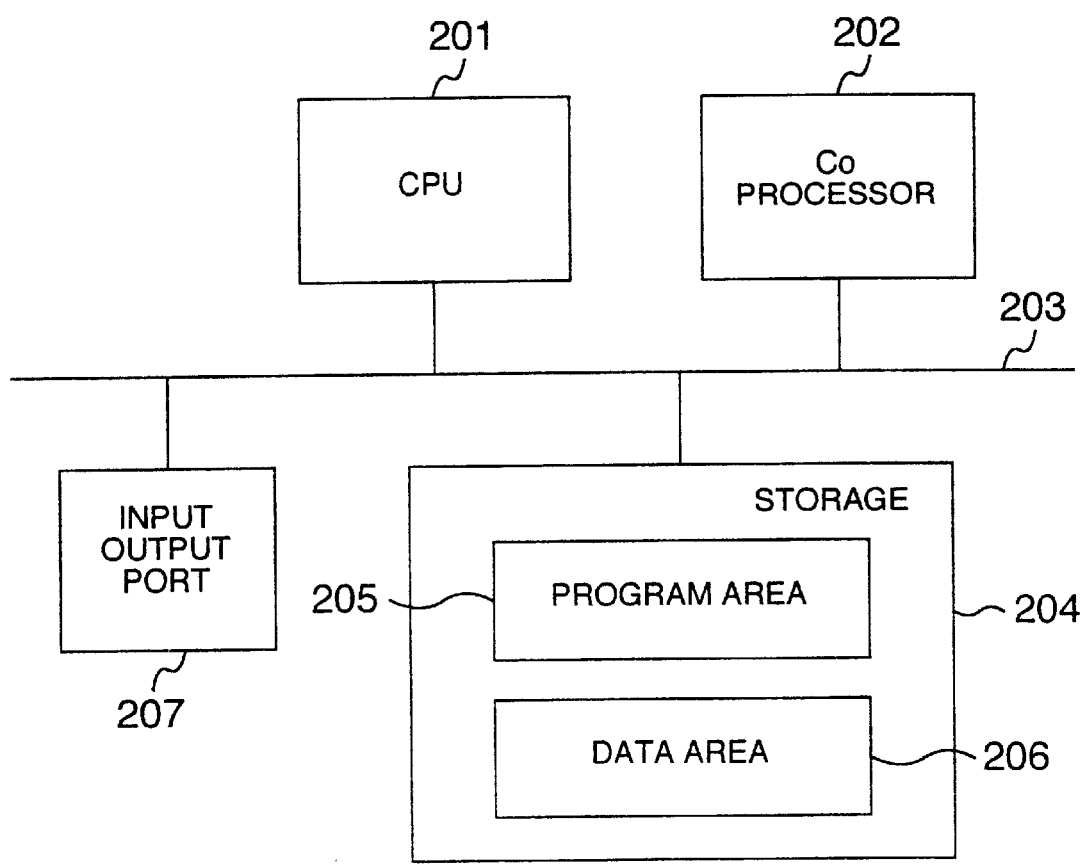
FIG. 2 is a diagram showing an example of the structure of hardware of a known IC card chip.
Figure 3:
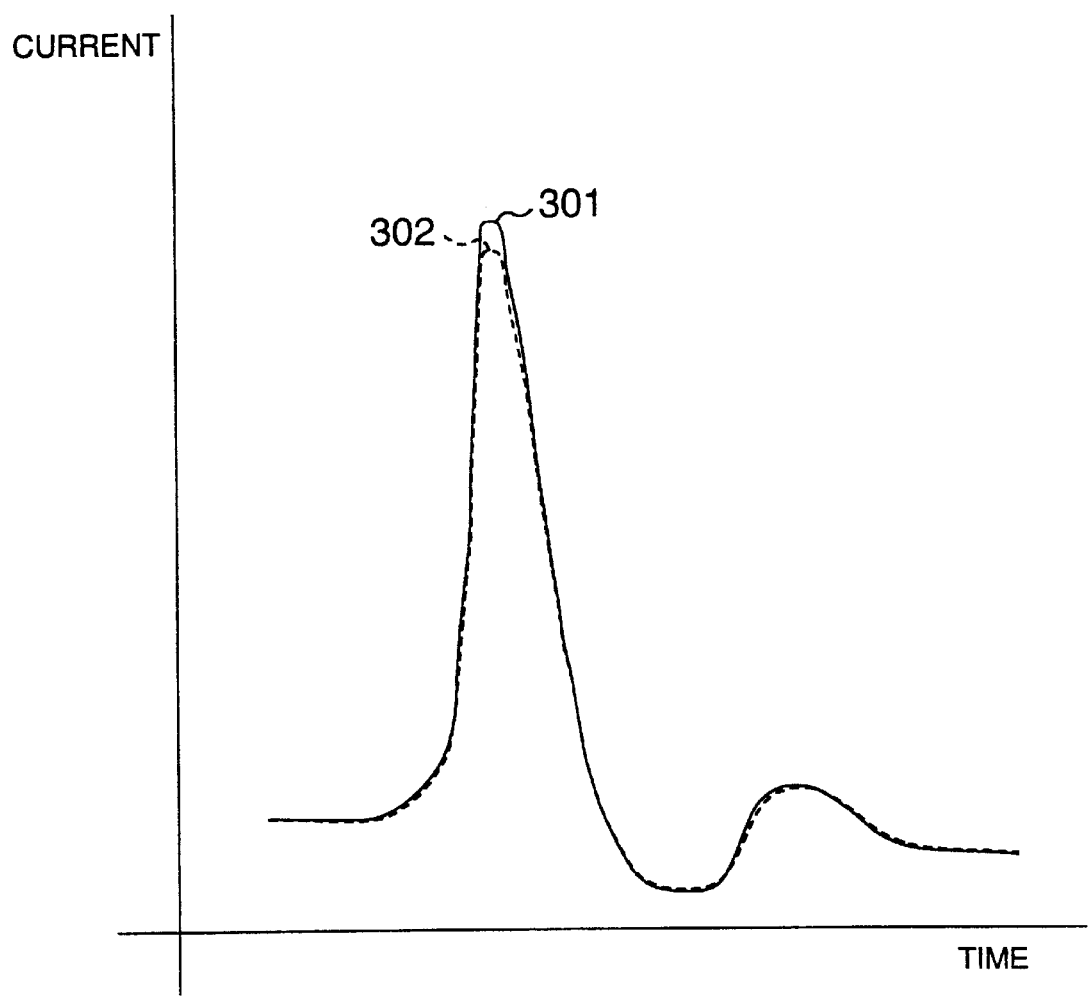
FIG. 3 is a diagram showing examples of wave shapes of consumption current of an IC card.

FIG. 2 shows the internal structure of the IC card chip 102. The structure has been described already with respect to conventional techniques. According to this invention, data to be processed by the program 205 is disturbed so that it becomes difficult to presume original data from the wave form of power consumed by the hardware of the IC card chip during data processing. The fundamental concept will be described by taking as an example the following simple instruction train:

$$\text{logica\_shift1 } R1 \tag{2}$$

$$\text{xor } R1\ R2 \tag{3}$$

The equation (2) is an instruction for logically looping the value in a register R1 to the left. The most significant bit moves to the least significant bit. The result is loaded in the register R1. The exclusive logical OR between the result and the value in a register R2 is calculated by the equation (2), and this result is loaded in the register R2. These operations are performed by this instruction train. Such instructions are frequently used in a cipher algorithm such as DES. Since the equations (2) and (3) use the process data itself, the amplitude of the power consumption is changed with the contents of the process data. There is therefore a possibility of presuming the data by monitoring the power consumption shape.

In order for the equations (2) and (3) not to use the process data itself, the instruction train is changed to:

$$\text{xor } X1\ R1 \tag{4}$$

$$\text{xor } X2\ R2 \tag{5}$$

$$\text{logica\_shift1 } R1 \tag{6}$$

$$\text{xor } R1\ R2 \tag{7}$$

$$\text{logica\_shift1 } X1 \tag{8}$$

$$\text{xor } X1\ X2 \tag{9}$$

$$\text{xor } X2\ R2 \tag{10}$$

where X1 and X2 are arbitrary random numbers and are data for disturbance. With the equations (4) and (5), an exclusive logical OR between R1 and X1 and between R2 and X2 is calculated to execute a transforming process for transforming original data. Although the equations (6) and (7) are expressed same as the equations (2) and (3), the values R1 and R1 in the equations (6) and (7) are not the values of original data because the transforming process was executed. With the equations (8) and (9), the disturbance data itself is processed. With the equation (10), an exclusive logical OR between the processed disturbance data and the process result of the equation (7) is calculated to execute an untransforming process for recovering the original data.

These processes will be specifically described by using particular numerical values. R1 and R2 have the following values:

$$R1: 11001010 \tag{11}$$

$$R2: 01010111 \tag{12}$$

The value of R1 processed by the equation (2) is:

$$R1: 10010101 \quad (13)$$

The process result by the equation (3) is:

$$R2: 11000010 \quad (14)$$

A modification of this invention will be described. First, the disturbance data has the following values, with the same values of R1 and R2 being used:

$$X1: 10010111 \quad (15)$$

$$X2: 00111010 \quad (16)$$

The process result by the equations (4) and (5) are:

$$R1: 01011101 \quad (17)$$

$$R2: 01101101 \quad (18)$$

The process results by the equations (6) and (8) are:

$$R1: 10111010 \quad (19)$$

$$R2: 11010111 \quad (20)$$

The process results of the data X1 and X2 for disturbance by the equations (8) and (9) are:

$$X1: 00101111 \quad (21)$$

$$X2: 00010101 \quad (22)$$

The result of the untransforming process by the equation (10) is the same as the result of the original data process indicated by the equation (14):

$$R2: 11000010 \quad (23)$$

As shown in this example, the transformed original data and the disturbance data are processed in a similar manner, and the results are untransformed to recover the original value. Since this data process does not use original data itself, it is difficult to presume the original data from the current wave shape, although the transformed data can be presumed.

The above example using particular numerical values will be expressed by a general format. The actual process is as follows:

$$\text{Output}(j) = f(\text{Input}(i)) \quad (24)$$

This process means that i inputs are subjected to a process f to output j outputs. In the example shown by the equations (2) and (3), there are two inputs R1 and R2 and one output stored in the register R2. In order that it becomes difficult to presume original data from the current wave shape during the process of the equation (24), the following equations are used:

$$\text{Input}X(i) = h(\text{Input}(i), X(i)) \quad (25)$$

$$\text{Output}X(j) = f(\text{Input}X(i)) \quad (26)$$

$$X\text{output}(j) = f(X(i)) \quad (27)$$

$$\text{Output}(j) = g(\text{Output}X(i), X\text{output}(i)) \quad (28)$$

The equation (25) transforms the input data Input(i) by using disturbance data X(i) to generate the transformed input data InputX(i). This transformation operation is represented by h. The equation (26) is a data process for processing data by using transformed input data. The equation (27) is a disturbance data process for processing the disturbance data in a manner similar to the input data. The equation (28) is an untransforming process for reversely processing the transformed input data process result OutputX(j) and the disturbance data process result Xoutput(j). The untransforming operation is represented by g.

The process by the equation (25) corresponds to the equations (4) and (5) in the above-described example, and the transformation operation h corresponds to the exclusive logical OR. The transformed input data process by the equation (26) corresponds to the equations (6) and (7). The equations (8) and (9) show the data processing for the disturbance data in the equation (27). The untransforming process by the equation (28) corresponds to the equation (10). The transformation operation g corresponds to the exclusive logical OR.

Which operations are selected for the transformation operation h and untransformation operation g is determined by the characteristics of the data process f. In the process by the equations (2) and (3), the exclusive logical OR is the transformation operation h and also the untransformation (inverse) operation g. For a shift operation and an XOR operation, by selecting the exclusive logical OR as the transformation operation h, the untransformation (inverse) operation g is the exclusive logical OR. This is because, the exclusive logical OR between the same data is logical 0 and the operation of the exclusive logical OR is vanished.

If the data process f is addition/subtraction, addition or subtraction can be selected as the transformation operation h and the corresponding inverse operation g is subtraction or addition. For example, the following operation:

$$\text{Output} = \text{Input}(1) + \text{Input}(2) - \text{Input}(3) \quad (29)$$

can be transformed into:

$$\text{Input}X(1) = \text{Input}(1) + X(1) \quad (30)$$

$$\text{Input}X(2) = \text{Input}(2) + X(2) \quad (31)$$

$$\text{Input}X(3) = \text{Input}(3) + X(3) \quad (32)$$

By processing the transformed input data, the process result of the transformed input data can be obtained:

$$\text{Output}X = \text{Input}X(1) + \text{Input}X(2) - \text{Input}X(3) \quad (33)$$

The disturbance data is processed in the similar manner:

$$X\text{output} = X(1) + X(2) - X(3) \quad (34)$$

Next, the untransforming process is executed:

$$\begin{aligned}\text{Output} = g(X\text{output}) &= \text{Output}X - X\text{output} \\ &= \text{Input}X(1) + \text{Input}X(2) - \text{Input}X(3) - \\ & \quad (X(1) + X(2) - X(3)) \\ &= \text{Input}(1) + \text{Input}(2) - \text{Input}(3)\end{aligned} \quad (35)$$

In the above manner, the original data can be obtained. This is because the original data can be obtained, in the addition/subtraction calculation, by adding a certain value and subtracting the added value from the last process result.

For the data process f of multiplication/division, the transforming process and untransforming process can be realized by selecting multiplication or division as the transformation operation h and division or multiplication as the untransformation operation. This is because, similar to the addition/subtraction, the original data can be obtained, in the multiplication/division calculation, by multiplying (dividing by) a certain value and dividing (multiplying) the last process result by the value.

For the data process f of addition and subtraction in modular calculation, addition and subtraction of the number multiplying the modulus N by a voluntary integer can be selected as the transformation operation h. For example, consider the following addition and subtraction in modular calculation:

$$\text{Output} = (\text{Input}(1) + \text{Input}(2) - \text{Input}(3)) \bmod N \quad (36)$$

The input data Input (i) is transformed:

$$\text{Input}X(i) = \text{Input}(i) + k(i)*N \quad (37)$$

By using the transformed input data, the addition and subtraction in modular calculation is executed:

$$\text{Output}X = (\text{Input}x(1) + \text{Input}x(2) - \text{Input}x(3)) \bmod N \quad (38)$$

The equation (38) can be transformed by using the equation (37):

$$\begin{aligned}\text{Output}X &= ((\text{Input}(1) + k(1)*N) + (\text{Input}(2) + k(2)*N) - \\ &\quad (\text{Input}(3) + k(3)*(N))) \bmod N \\ &= ((\text{Input}(1) + \text{Input}(2) - \text{Input}(3)) + (k(1)*N + \\ &\quad k(2)*N - k(3)*N)) \bmod N\end{aligned} \quad (39)$$

By using the property of the modular calculation:

$$0 = k*N \bmod N \quad (40)$$

the value in the second parentheses of the equation (3) becomes 0 and the equation (39) is given by:

$$\text{Output}X = (\text{Input}(1) + \text{Input}(2) - \text{Input}(3)) \bmod N \quad (41)$$

Namely, the calculation result of the transformed input data is the same as the calculation result of the original data. This is an example that the disturbance data process and untransforming process are unnecessary if the above-described feature of the modular calculation is incorporated. The disturbance data process result:

$$X\text{output}(i) = (k(1)*N + k(2)*N - k(3)*N) \bmod N \quad (42)$$

is 0 so that the disturbance data process and untransforming process are unnecessary.

For the data process f of multiplication in modular calculation, an integer multiple of the modulus N added with 1 can be used for the transformation operation h. Consider for example the following multiplication in modular calculation:

$$\text{Output} = \text{Input}(1)*\text{Input}(2)*\text{Input}(3) \bmod N \quad (43)$$

The input data Input(i) is transformed:

$$\text{Input}X(i) = \text{Input}(i)*(k(i)*N + 1) \quad (44)$$

By using the transformed input data, the multiplication modular calculation is executed:

$$\text{Output}X = \text{Input}X(1)*\text{Input}X(2)*\text{Input}X(3) \bmod N \quad (45)$$

The equation (45) can be transformed by using the equation (44):

$$\begin{aligned}\text{Output}X &= (\text{Input}(1)*(k(1)*N + 1))*(\text{Input}(2)*(k(2)* \\ &\quad N + 1))*(\text{Input}(3)*(k(3)*N + 1)) \bmod N \\ &= (\text{Input}(1)*\text{Input}(2)*\text{Input}(3))*((k(1)*N + 1)* \\ &\quad (k(2)*N + 1)*((k(3)*N + 1)) \bmod N\end{aligned} \quad (46)$$

By using the property of modular calculation:

$$0 = k*N \bmod N \quad (47)$$

the equation (46) is given by:

$$\begin{aligned}\text{Output}X &= (\text{Input}(1)*\text{Input}(2)*\text{Input}(3))* \\ &\quad (1*1*1) \bmod N \\ &= \text{Input}(1)*\text{Input}(2)*\text{Input}(3) \bmod N\end{aligned} \quad (48)$$

Namely, the calculation result of the transformed input data is the same as the calculation result of the original data. This is also an example that the data processing of the disturbance data and the untransform operation are unnecessary due to the property of modular calculation.

For the function f of multiplication by an integer in modular calculation with modulus N, the transform operation h can be selected as multiplication by an invertible number x in this modular calculation. In this case, g is the the multiplication by Y such that:

$$1 = X*Y \bmod N \quad (49)$$

A simple example of such numerical values is that X=2 and Y=(N+1)/2; (N is an odd number). The process result of original data can be obtained by multiplying X as the transformation operation, and multiplying Y in the untransforming process by the number of X multiplication times. Consider for example the following addition and subtraction in modular calculation:

$$\text{Output} = \text{Input}(1)*\text{Input}(2)*\text{Input}(3) \bmod N \quad (50)$$

The input data Input(i) is transformed:

$$\text{Input}X(i) = \text{Input}(i)*X \quad (51)$$

By using the transformed input data, the addition/subtraction modular calculation is performed:

$$\text{Output}X = \text{Input}X(1)*\text{Input}X(2)*\text{Input}X(3) \bmod N \quad (52)$$

If a value multiplied by Y by the number of X multiplication times is selected for the untransforming process g, the original data can be obtained by performed the untransforming process g for the outputX:

$$\begin{aligned}\text{Output} &= \text{Output}X * Y * Y * Y \bmod N \\ &= \text{Input}X(1)*\text{Input}X(2)*\text{Input}X(3)*Y*Y*Y \bmod N \\ &= \text{Input}(1)*X*\text{Input}(2)*X*\text{Input}(3)*X*Y*Y* \\ &\quad Y \bmod N \\ &= \text{Input}(1)*\text{Input}(2)*\text{Input}(3)*X*X*X*Y*Y*\end{aligned} \quad (53)$$

-continued $$Y \bmod N$$
$$= Input(1) * Input(2) * Input(3) * X * Y * X * Y *$$
$$X * Y \bmod N$$
$$= Input(1) * Input(2) * Input(3) \bmod N$$

For the equation (53), the feature of the equation (49) was used. In this example, although the disturbance data process is unnecessary, if the inverse is multiplied in the modulus N by the number of disturbance data multiplication times, in the untransforming process, the correct result can be obtained.

It is also necessary to disturb a retrieval operation of data from a table in order not to presume data from the current wave shape. An example of disturbance of table data and disturbance of table address will be described by taking as an example retrieving data from a table shown in FIG. 33.

Figures 35, 36:
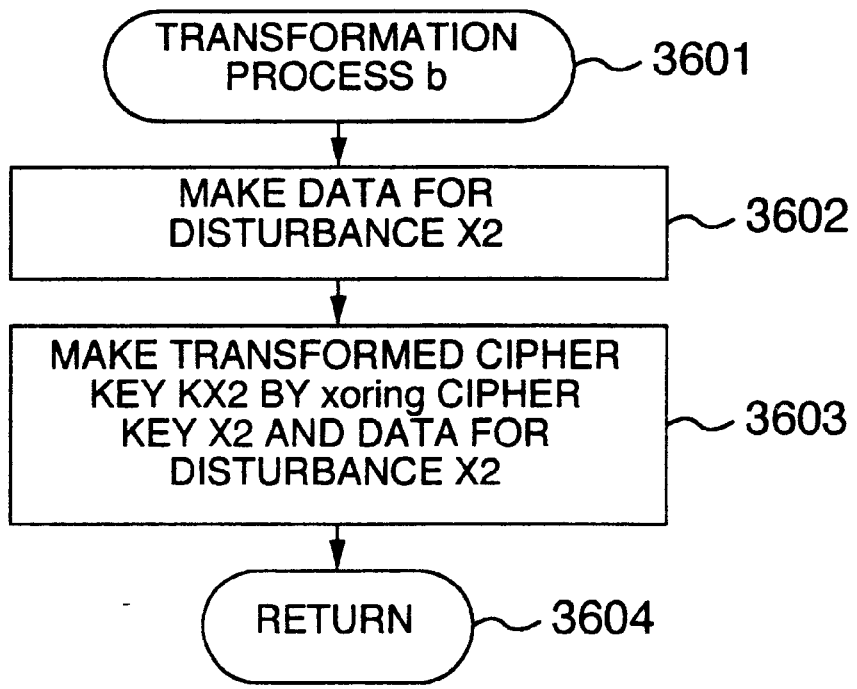
FIG. 35 shows a table whose arrangement is modified from that of the table shown in FIG. 34, according to the embodiment of the invention.
FIG. 36 is a diagram illustrating a transforming process b, according to an embodiment of the invention.

An exclusive logical OR between the table data shown in FIG. 33 and disturbance data X1 is calculated. For example, the disturbance data of "9" is selected and an exclusive logical OR between the table value and "9" is calculated. The results are shown in the table of FIG. 34. Next, in order to disturb the table address, an exclusive logical OR between the row number and selected disturbance data X2 of "3" and between the column number and selected disturbance data X3 of "2" is calculated to rearrange the table. The results are shown in FIG. 35. The data 3301 of "0" at the first row and second column of the original table shown in FIG. 33 is changed to the data 3401 of "9" in the table shown in FIG. 34 after the exclusive logical OR of the disturbance data X1 is calculated. After the exclusive logical ORs between the row number and disturbance data X2 and between the column number and disturbance data X3 is calculated, the data 3401 moves to the position of data 3501. Such tables are prepared in order to disturb the retrieval operation of data from the table.

It is assumed herein that a row number variable Gyou and a column number variable Retsu have been transformed already through an exclusive logical OR of disturbance data Y1 and Y2 before the address calculation is executed. Namely, it is assumed that correct row and column numbers Gyou and Retsu cannot be obtained until the exclusive logical OR between the Y1 and Y2 and the Gyou and Retsu is calculated. This can be expressed by the following relations:

$$Gyou = GyouY1 \text{ xor } Y1 \tag{54}$$

$$Retsu = RetsuY2 \text{ xor } Y2 \tag{55}$$

However, if the table shown in FIG. 33 is used for this untransforming process, the correct address data is used so that the address data may be presumed from the current wave shape. Therefore, first, the disturbance data X2 and X3 used for disturbing the row and column numbers when the table shown in FIG. 35 was formed, are used:

$$GyouY1X2 = GyouY1 \text{ xor } X2 \tag{56}$$

$$RetsuY1X3 = RetsuY2 \text{ xor } X3 \tag{57}$$

The disturbance data used is then subjected to the untransforming process:

$$GyouX2 = GyouY1X2 \text{ xor } Y1 \tag{58}$$

$$RetsuX3 = RetsuY2X3 \text{ xor } Y2 \tag{59}$$

With this procedure, the correct row and column numbers are not used so that it is difficult to presume the correct row and column numbers from the current wave shape. By using GyouX2 and RetsuX3 and referring to the table TableX1X2X3 shown in FIG. 35, data X1 is obtained:

$$DataX1 = TableX1X2X3(GyouX2, RetsuX3) \tag{60}$$

Since the table shown in FIG. 35 is already transformed by the disturbance data X1, the disturbance data X1 is used in the succeeding process. The processes by the equations (56) to (60) do not use original data.

Each time a predetermined amount of processes is executed, the table data disturbance data X1 and row and column number disturbance data X2 and X3 are randomly generated to transform the tables. With this transforming process, the tables are transformed so that it is difficult to presume the data from the current wave shape.

Figure 4:
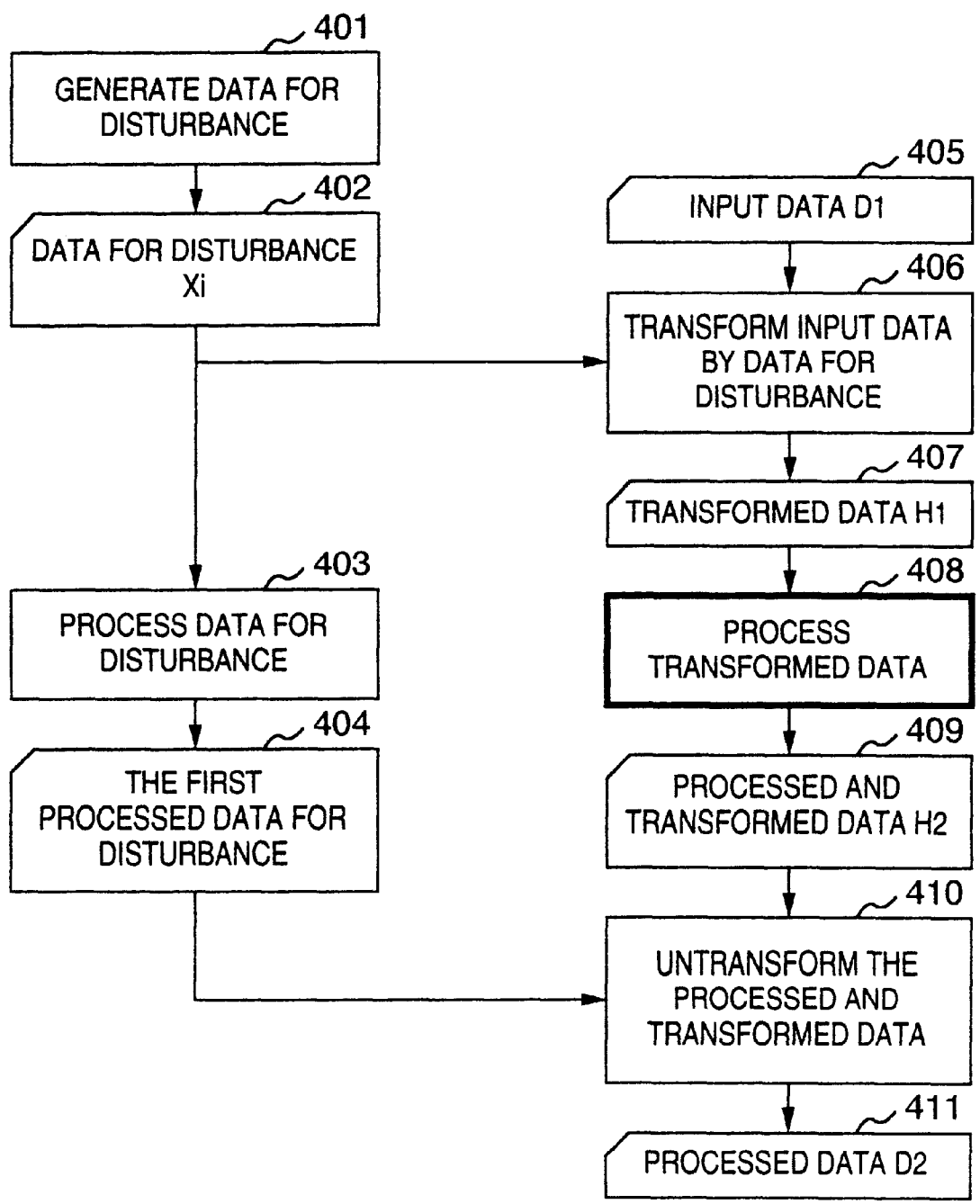
FIG. 4 is a diagram illustrating a procedure of data transformation using one disturbance data according to an embodiment of the invention.

In the foregoing, the type of disturbance data and a method of transforming data have been described. Next, the sequential processes therefor will be described. FIG. 4 illustrates an embodiment of a fundamental information concealment procedure using disturbance data.

FIG. 4 illustrates a fundamental procedure. A disturbance data generating unit generates disturbance data Xi (401). As a general method therefor, there is a method of generating a random number having a necessary length by using a random number generator or a pseudo random number generator. Next, a data transforming process unit (406) transforms input data D1 (405) by the disturbance data Xi to generate transformed data H1 (407). As described earlier, the transforming process may be an exclusive logical OR, addition and subtraction, multiplication and division, or the like. A transformed data process unit processes the transformed data H1 (408) to generate processed and transformed data H2. A disturbance data process unit performs (403) a similar data process to that of the input data to generate processed disturbance data Xo (404). A data untransforming process unit obtains (410) correct processed data D2 by using the processed disturbance data Xo and processed and transformed data D2 (411). The process to be executed by the data transforming unit (406) and data untransforming unit may include, as described earlier, an exclusive logical OR, addition and subtraction, multiplication and division, modular calculation, or the like.

Figure 5:
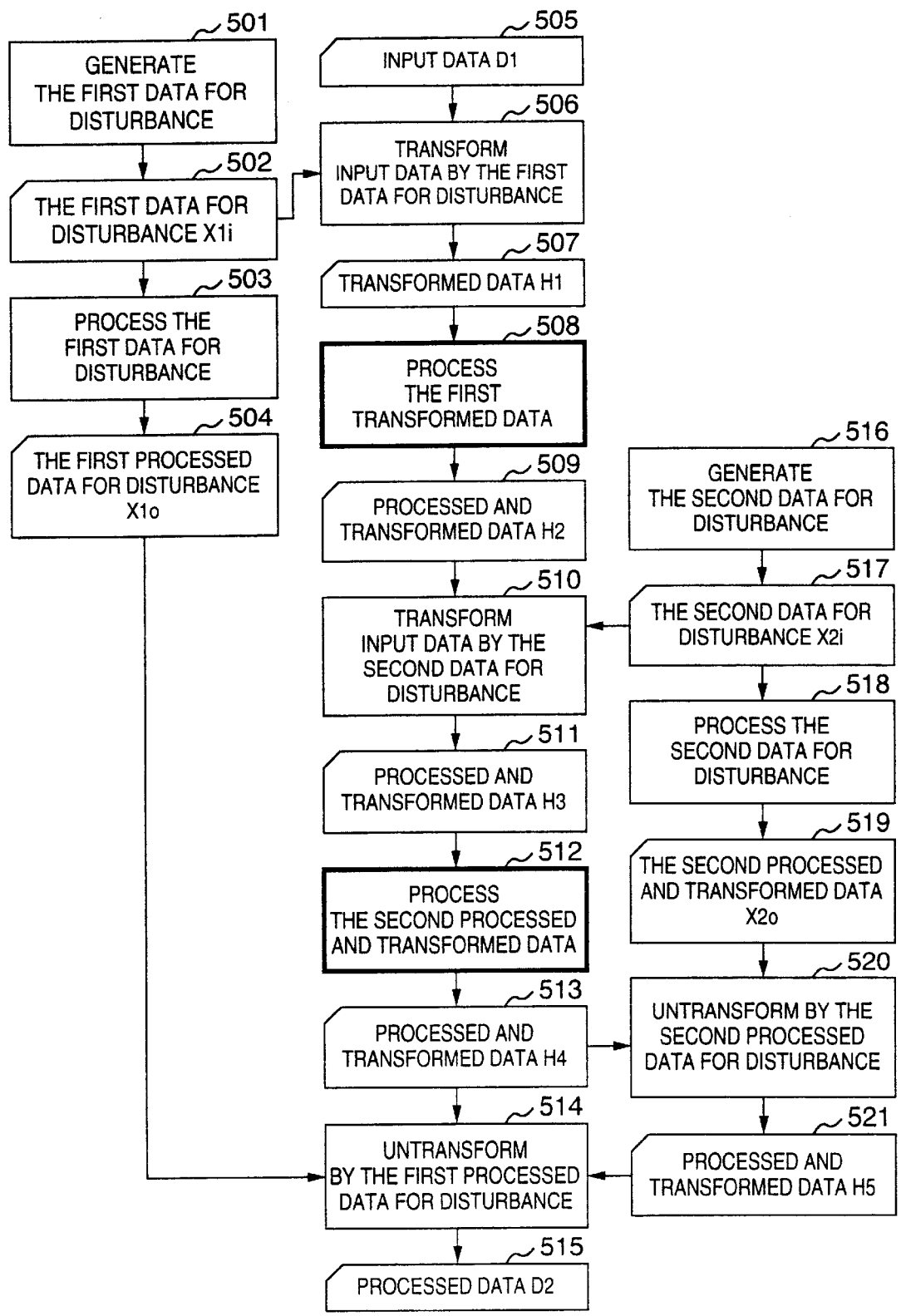
FIG. 5 is a diagram illustrating a procedure of data transformation using two sets of disturbance data in a nesting state, according to an embodiment of the invention.

In the embodiment shown in FIG. 5, two sets of disturbance data are used. An information concealment procedure using first disturbance data contains another information concealment procedure using second disturbance data. The main flow is similar to the embodiment shown in FIG. 4. Transformed data H1 (507) transformed by the first disturbance data is processed. The processed and transformed data H2 (509) is transformed by a second data transforming process unit (510) by using the second disturbance data X2i to thereby generate processed and transformed data H3 (511). This processed and transformed data H3 is processed by a second deformed data process unit (512) to generate processed and transformed data H4. A second data untransforming process unit (520) untransforms the second disturbance data to generate processed and transformed data H5 (521). A first data untransforming process unit (514) untransforms the first disturbance data to obtain correct processed data D2 (515). An example of transformation using an exclusive logical OR is as follows:

$$H1 = D1 \text{ xor } X1i$$

$$H2 = f1(H1)$$

$$X1o = f1(X1i)$$

$$H31 = H2 \text{ xor } X2i$$

$$H32 = D2 \text{ xor } X2i$$

$$H4 = f2(H31, H32)$$

$$X2o = f2(X2i, X2i)$$

$$H5 = H4 \text{ xor } X2o$$

$$D2 = H5 \text{ xor } X1o \tag{61}$$

The data processes are represented by f1 and f2. As in this example, since the second data process f2 uses another data D2 and this data D2 is transformed by the second disturbance data, the procedure of this embodiment is effective.

Figure 6:
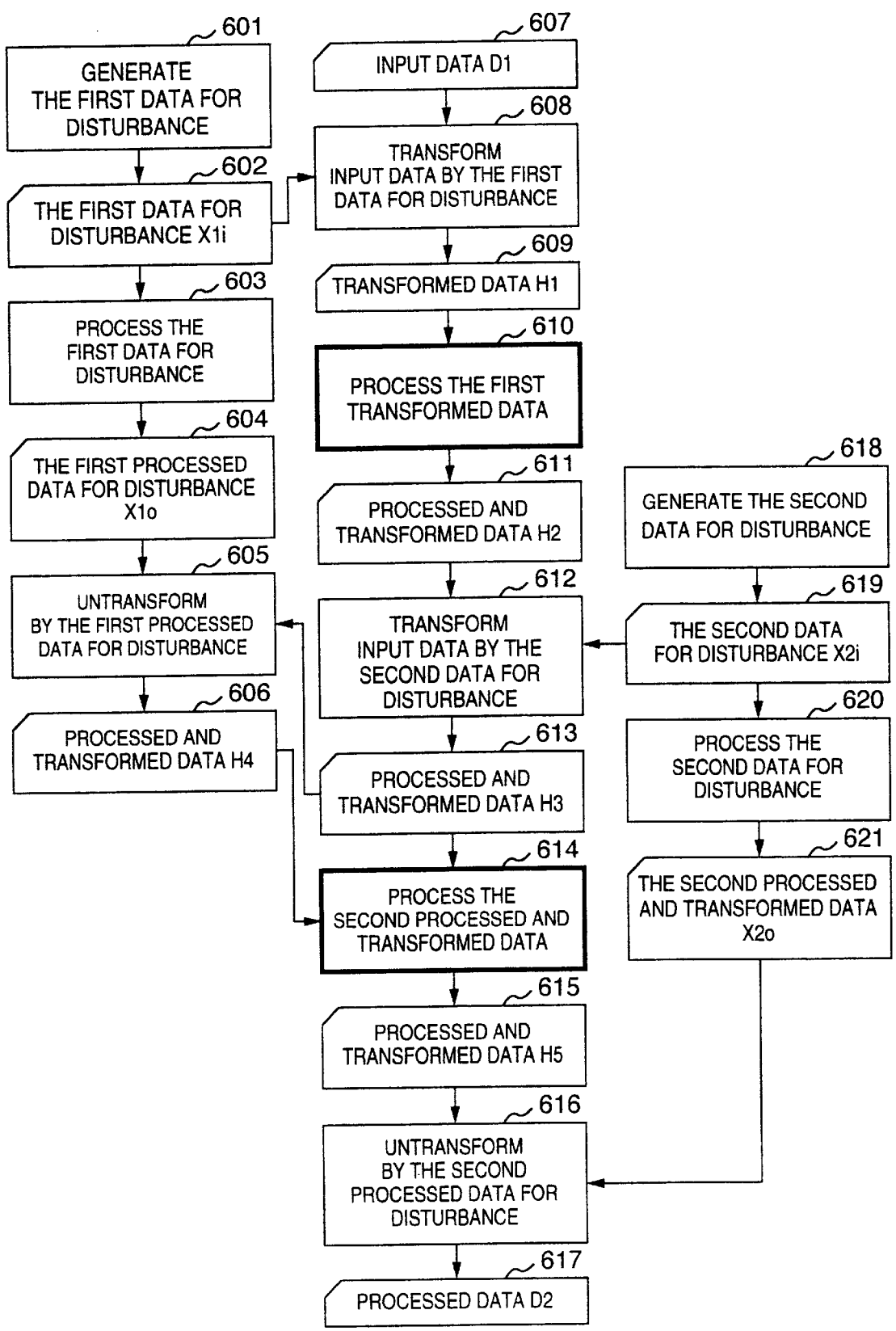
FIG. 6 is a diagram illustrating a procedure of data transformation using two sets of disturbance data in a continuous state, according to an embodiment of the invention.

Also in the embodiment shown in FIG. 6, two sets of disturbance data are used. A significant difference from the embodiment shown in FIG. 5 is that an information concealment procedure using first disturbance data is continuous with another information concealment procedure using second disturbance data. In this procedure of concealing, the process using correct data, prior to the untransforming process for the first disturbance data, the input data is further transformed by using the second disturbance data. Transformed data H1 (609) transformed by the first disturbance data is processed by a first transformed data process unit (610). The processed and transformed data H2 (611) is transformed by a second transformed data generating unit (612) by using the second disturbance data H2 (611) to generate processed and transformed data H3 (613). A first data untransforming process unit (605) untransforms for the first disturbance data. This process result of processed and transformed data H4 (606) is used for a second transformed data process unit (614) to generate processed and transformed data H5 (615). A second data untransforming process unit (616) untransforms the data to generate correct processed data D2 (617). An example of transformation using an exclusive logical OR is as follows:

$$H1 = D1 \text{ xor } X1o$$

$$H2 = f1(H1)$$

$$X1o = f1(X1i)$$

$$H3 = H2 \text{ xor } X2i$$

$$H4 = H3 \text{ xor } X1o$$

$$H5 = f2(H4)$$

$$X2o = f2(X2i)$$

$$D2 = H5 \text{ xor } X2i \tag{62}$$

This procedure is effective for the case wherein there are a plurality of processes and a plurality set of disturbance data are used.

Figure 7:
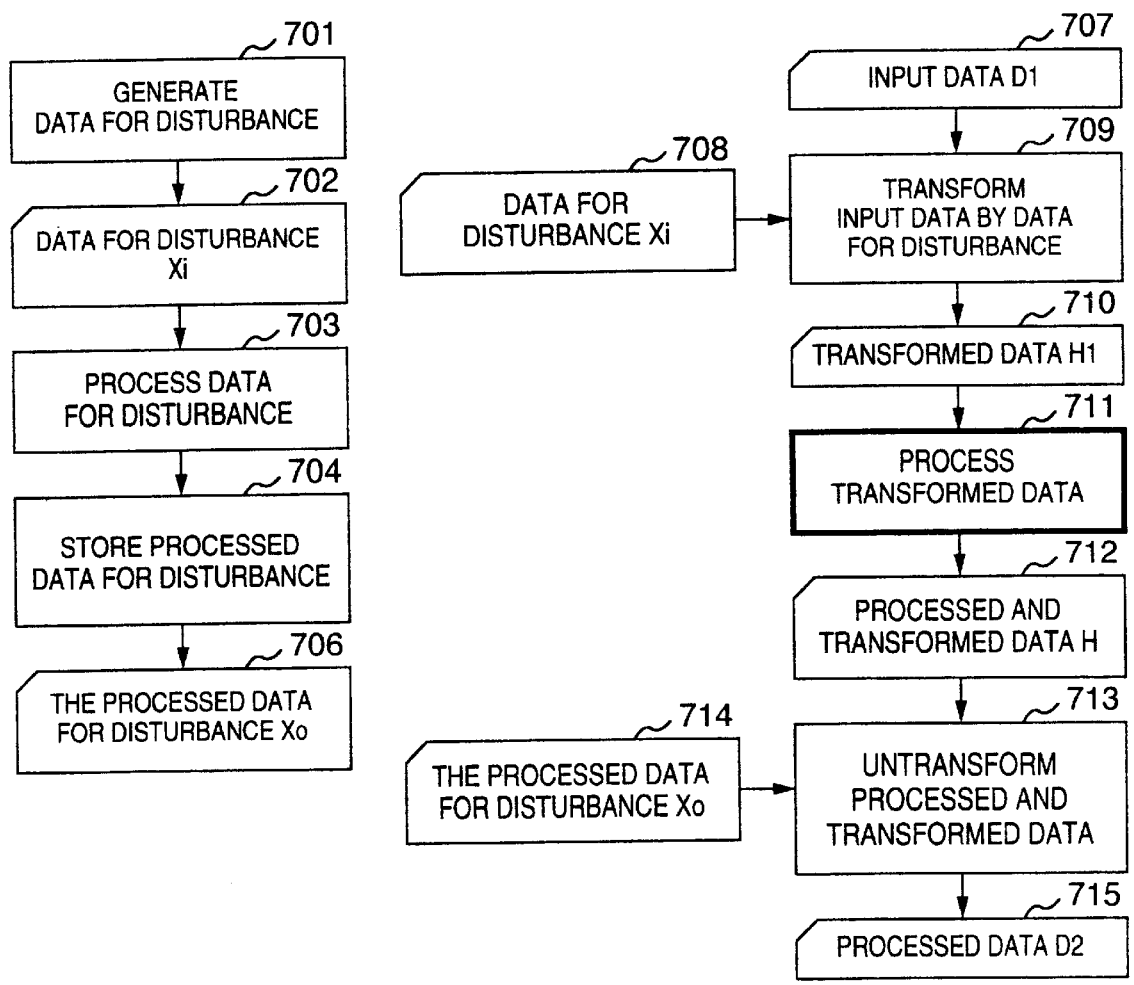
FIG. 7 is a diagram illustrating a procedure of data transformation wherein disturbance data is processed in advance, according to an embodiment of the invention.

In the embodiment shown in FIG. 7, the disturbance data is processed in advance in order to make the procedure efficient. A disturbance data process unit generates in advance processed disturbance data Xo (703) which is stored in a processed disturbance data storage unit (706). During the procedure, a data untransforming process unit (713) reads the stored processed disturbance data (714) to use it. This procedure is efficient if similar data processes are executed a plurality of times.

However, since the disturbance data is used a plurality of times, it is more effective to change the disturbance data each time the data process is executed, as in the embodiment shown in FIG. 4. This can be settled from the tradeoff between the process time and the information security.

Figure 8:
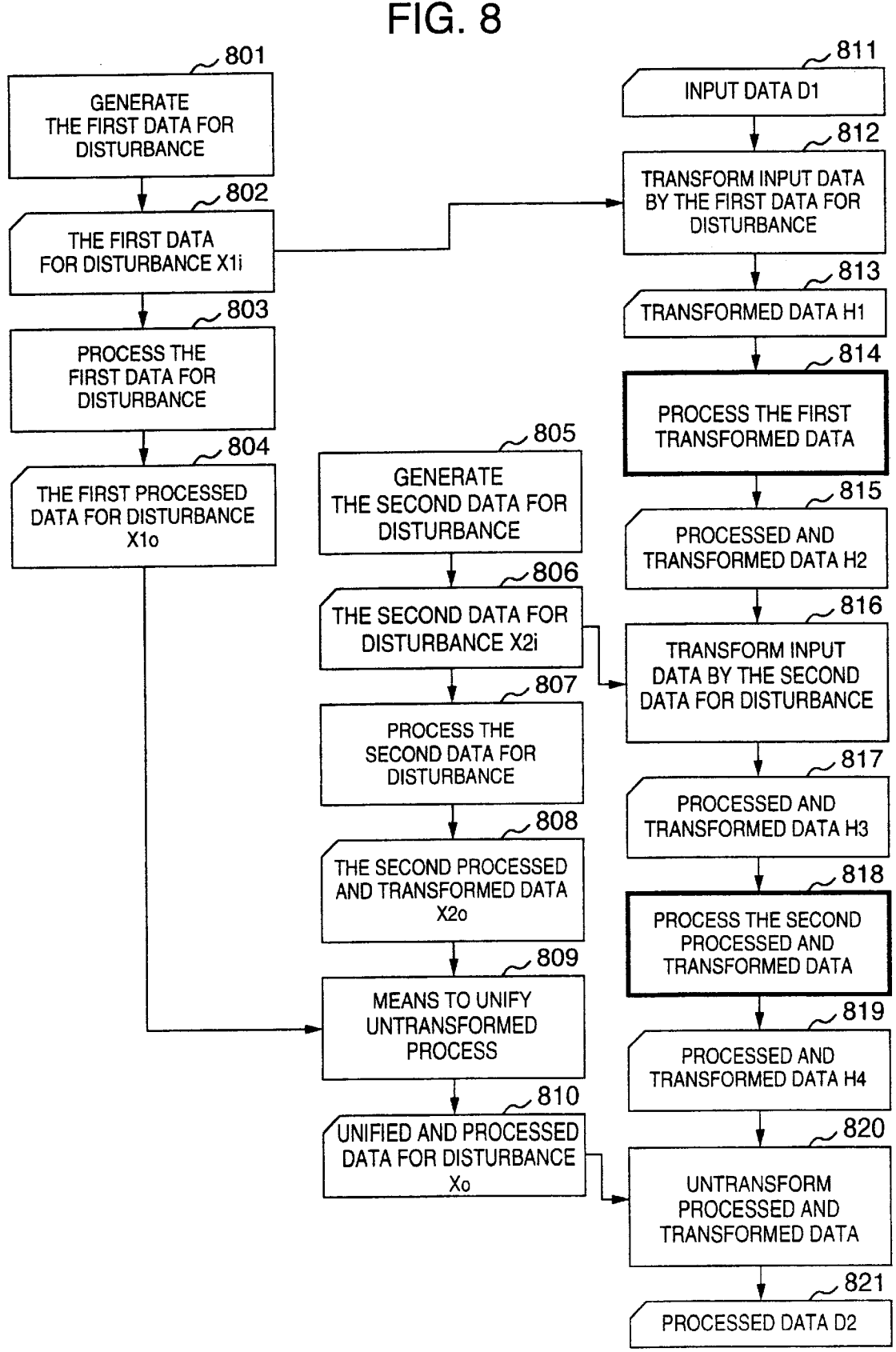
FIG. 8 is a diagram illustrating a procedure of data transformation wherein the untransforming processes for the two sets of disturbance data are unified, according to an embodiment of the invention.

In the embodiment shown in FIG. 8, the untransforming processes for the first and second disturbance data is unified, and thereafter, by using the unified result, the data is untransformed. First and second disturbance data process units 803 and 807 process the first and second disturbance data to generate processed disturbance data X1o and X2o. These data are unified by a data untransforming and unifying unit to generate unified and processed disturbance data Xo. By using this data, an untransforming process unit (820) untransforms the processed and transformed data H4 (819) processed by first and second transformed data process units (814 and 818) to generate correct processed data D2. With this procedure, the processed disturbance data is unified and an unified untransforming process is executed thereafter, instead of independently executing the untransforming process. This procedure is effective for the case wherein the untransforming process takes a long process time.

Next, embodiments using symmetric cryptographic DES (data encryption standard) will be described. The invention is applicable to other cryptographic systems.

DES performs encryption and decryption of 64-bit data (plain text or cipher text) by using a cipher key of 56-bits. Since the same cipher key is used for both encryption and decryption, DES is called a symmetric cryptography. As trump cards are turned randomly, bits of a plain text (to be encrypted) are randomly exchanged and enciphered. Data exchange is performed in accordance with the cipher key. When data is deciphered, bits of a cipher text are exchanged in the reverse order of the enciphering to recover the original data. Data exchange of DES uses two exchange methods one being a one-bit unit basis and the other being a plural-bit unit basis. The former is called permutation and the latter is called substitution.

Figure 9:
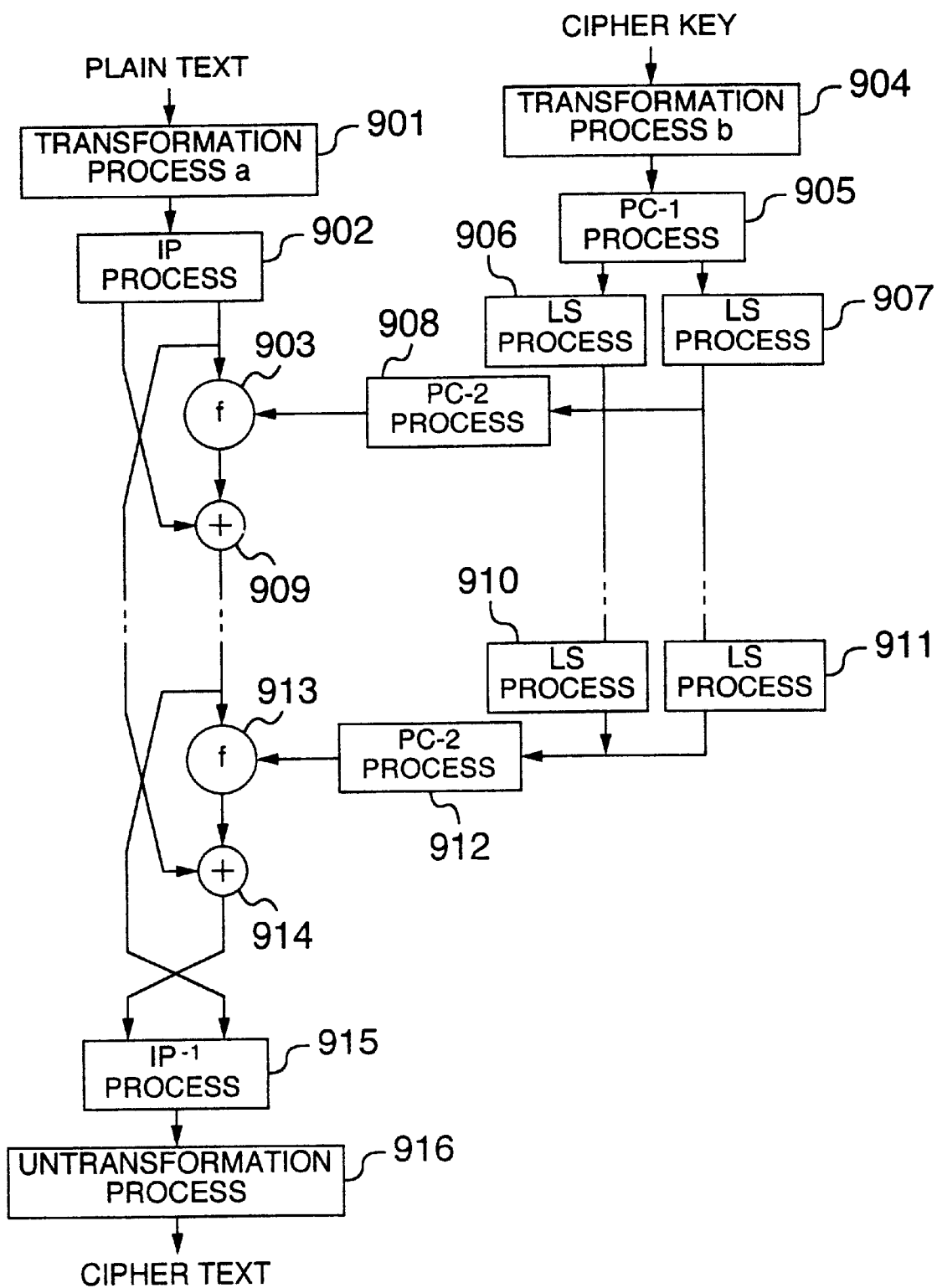
FIG. 9 is a diagram illustrating the overall process flow of DES, according to an embodiment of the invention.

Referring to FIG. 9, DES cryptography will be described. A transforming process a (901), a transforming process b (904), and an untransforming process (916) pertain to the present invention and are not relevant to the essential cryptography of DES. A cipher text is subjected first to initial permutation (IP) 902. This permutation is performed by using an initial permutation table to exchange 64-bit data of the cipher text on the one-bit unit basis. A series of such operations is repeated sixteen stages to inverse permutation ($IP^{-1}$) 915 of the initial permutation.

At each stage, a process called an f function 903 is calculated by inputting data of 32 bits of either the first or second half at the preceding stage and the cipher key, and then an exclusive logical OR operation 909 is performed by using the output of the f function and 32 bits of the remaining half at the preceding stage. Data of the cipher key is also exchanged. Data of the cipher key is first subjected to selectable permutation PC-1 (905) by using a table PC-1. Thereafter, data of the cipher key is subjected to selectable permutation PC-2 (908) by using a table PC-2. At the next stage, each set of 28 bits of the cipher key rounded in accordance with an RS table is used.

In this embodiment, before the IP process, the transforming process a (901) for transforming a plain text, transforming process b (904) for untransforming a cipher key, and lastly untransforming process (916) are additionally executed. The transforming process a (901) transforms a plain text so as to later process the transformed plain text and so as not to process the plain text itself by the IP process (902) and f function process (903). Data of the plain text therefore becomes hard to be presumed from the current wave shape during the data process. The transforming process b (904) transforms a cipher key so as to later process the transformed cipher key and so as not to process the cipher key itself by the PC-1 process (905), LS process (907), PC-2 process (908) and f function (903). Data of the cipher key therefore becomes hard to be presumed from the current wave shape during the data-process.

Figure 10:
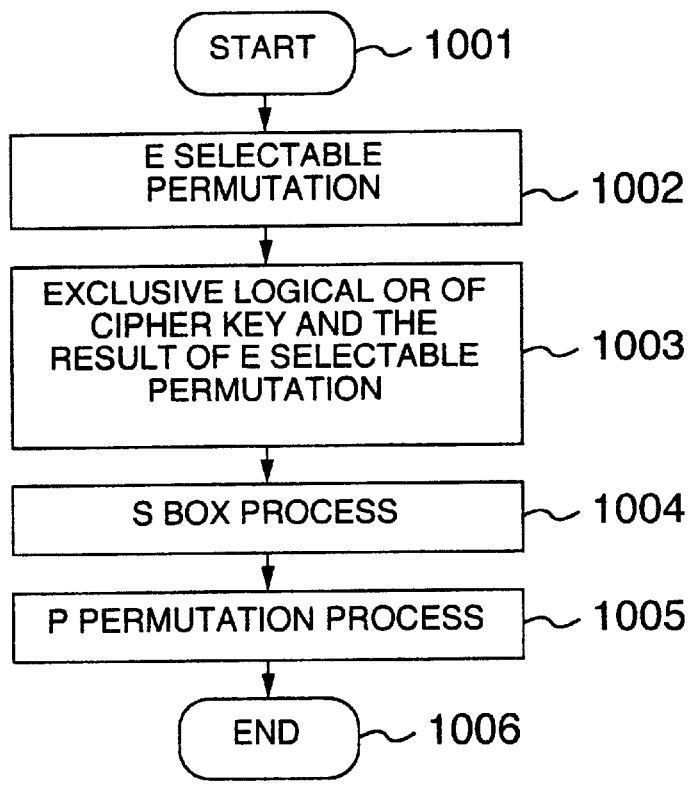
FIG. 10 is a diagram illustrating the f function process of DES, according to an embodiment of the invention.

The process by the f function is illustrated in FIG. 10. Data input to the f function is subjected to selectable (expanding) permutation by using an E selectable permutation matrix (1002). Next, an exclusive logical OR is calculated between the cipher key and a result of the selectable permutation for the input data (1003), an S box process is executed (1004), and a P permutation process is executed (1005). In the S box process, each 6-bit set is extracted from 48 bits which are a result of the exclusive logical OR at 1003, to acquire the row and column numbers of an S box table and generate 4-bit data. The contents of the S box table change with the position of each 6-bit set. The P permutation process exchanges the bit positions of 32 bits by using a P permutation table.

Figure 11:
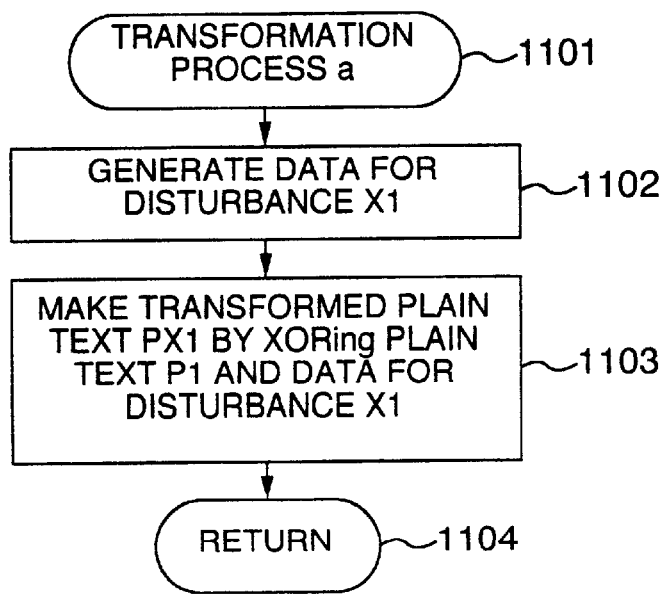
FIG. 11 is a diagram illustrating a transforming process 1, according to an embodiment of the invention.

The transforming process a (901) and transforming process b (902) are fundamentally the same. With reference to FIG. 11, the transforming process a for transforming data of a plain text will be described. Disturbance data X1 is randomly generated. The disturbance data is generated by using a random number generator or a pseudo random number each time an encryption (or decryption) process of DES is performed (1102). Different disturbance data is therefore used for each process. Next, an XOR (exclusive logical OR) between the disturbance data X1 and a plain text P1 is calculated to generate a transformed plain text (PX1 (1103). Although a plain text of DES has 64 bits, the random number may be either 64 bits or 8 bits. In this case, if the number of bits of the random number is smaller than 64 bits, it is necessary to expand it to obtain the disturbance data X1 of 64 bits. If the generated random number has 8 bits, this number may be repeated eight times to generate the disturbance data X1 of 64 bits. Since the exclusive logical OR (XOR) was used for transformation, XOR between the disturbance data X1 and transformed plain text PX1 generates the plain text P.

The transforming process b (904) for transforming data of a cipher key is illustrated in FIG. 36. A different point from the embodiment shown in FIG. 11 is that a cipher key K and disturbance data X2 are used in place of a plain text and disturbance data X1. A cipher key of DES has 64 bits same as that of a plain text. With the transforming process b, a transformed cipher key KX2 is generated.

Figure 12:
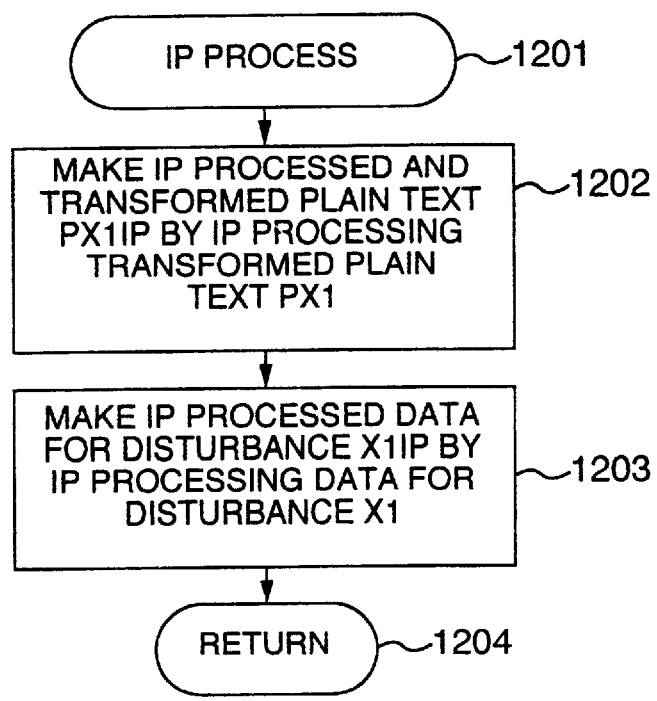
FIG. 12 is a diagram illustrating an IP process, according to an embodiment of the invention.
Figure 13:
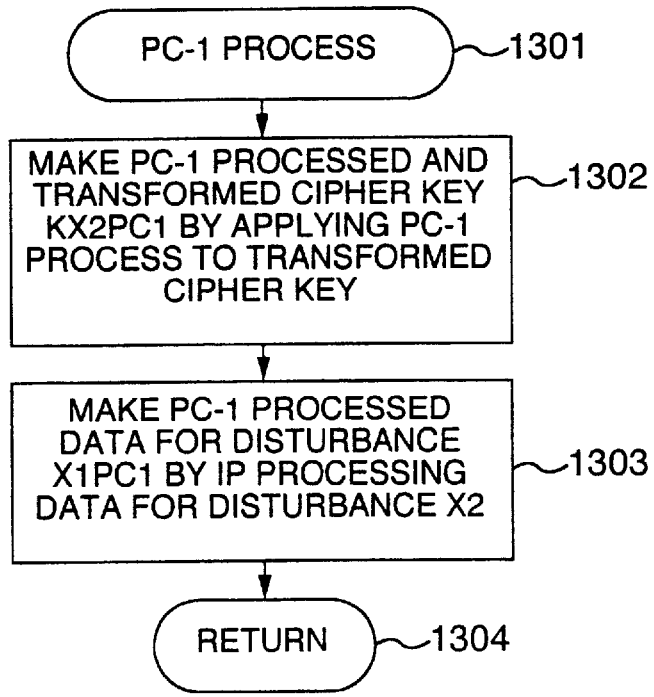
FIG. 13 is a diagram illustrating a PC-1 process, according to an embodiment of the invention.
Figure 14:
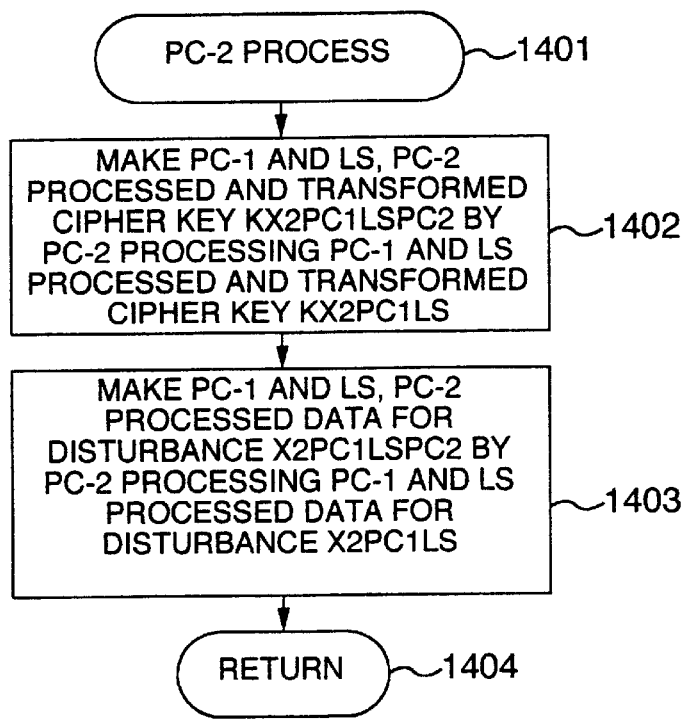
FIG. 14 is a diagram illustrating a PC-2 process, according to an embodiment of the invention.

Next, the IP process (902) will be described. The IP process exchanges the positions of a plain text having 64 bits by using a table shown in FIG. 37. In accordance with this table, the first bit of an output is exchanged with the 58-th bit of an input, the second bit of the output is exchanged with the 50-th bit of the input, . . . , and the 64-th bit of the output is exchanged with the 7-th bit of the input. The IP process of this embodiment will be described with reference to FIG. 12. First, the transformed plain text PX1 is subjected to the IP process to generate an IP processed and transformed plain text PX1IP (1202). Bit exchange is performed conforming to the table shown in FIG. 37. Next, the disturbance data X1 is also subjected to the IP process to generate an IP processed and transformed disturbance data X1IP (1203). An exclusive logical OR between the IP processed and transformed plain text PX1IP and IP processed and transformed disturbance data X1IP can generate a result of IP processed plain text. This is because a relation is retained in which the disturbance data moves in a similar manner to the transformed plain text PX1 because of a bit motion of the IP process and so the exclusive logical OR of a one-bit unit basis generates correct data. The lower 32 bits of the result of the IP process are used by a first stage f function (903) and a second stage exclusive logical OR, whereas the upper 32 bits are input for the exclusive logical OR (909).

In the IP process, the values of bits of the transformed plain text PX1 are different from the values of bits of the original plain text. It is therefore difficult to presume the data of the original plain text from the current wave shape during the IP process. The larger the number of "1" bits, the large the consumption current. However, the number of "1" bits of the transformed plain text is related not at all to the number of "1" bit of the original plain text, and so it is difficult to presume the data of the original plain text. As above, since the plain text is transformed by using disturbance data, presuming the original data is difficult even if the current wave shape during the process is monitored.

With the PC-1 process, a PC-1 transformation table shown in FIG. 38 is used, a cipher key of 64 bits is changed to a cipher key of 56 bits by removing the parity bits of 8 bits, and the order of 56 bits is exchanged. The table shown in FIG. 38 is used in a similar manner to the table shown in FIG. 37. An exclusive logical OR between the PC-1 processed and transformed cipher key KX2PC1 and PC-1 processed and transformed disturbance data X2PC1 can generate a correct PC-1 processed and transformed cipher key.

Figure 15:
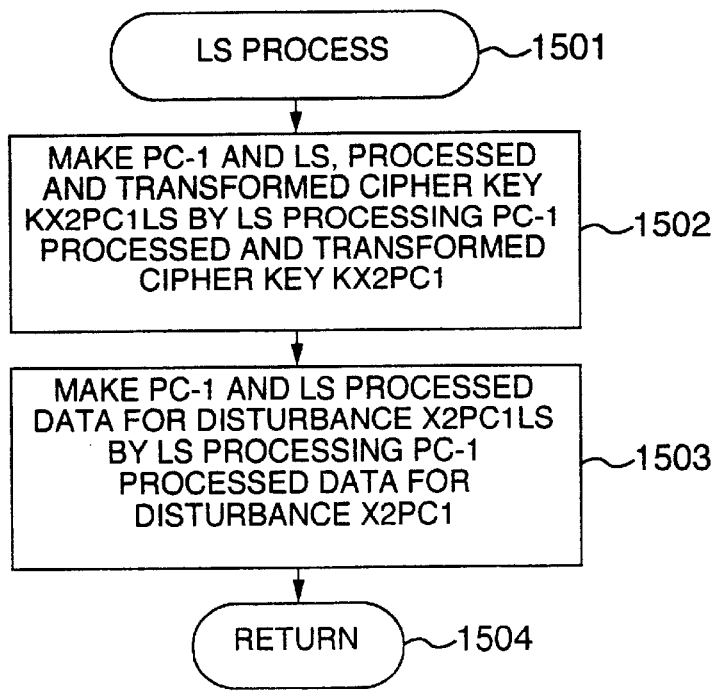
FIG. 15 is a diagram illustrating an LS process, according to an embodiment of the invention.

With the LS process, the cipher key of 56 bits generated by the PC-1 process is divided into right 28 bits and left 28 bits which are then shifted one bit or two bits to the left in accordance with an LS table. This embodiment will be described with reference to FIG. 15. First, at 1502 the PC-1 processed and transformed cipher key KX2PC1 is subjected to the LS process to generate a PC-1 and LS processed and transformed cipher key KX2PC1LS. At 1503 the PC-1 processed disturbance data X2PC1 is subjected to the LS process to generate a PC-1 and LS processed disturbance data X2PC1LS. Since the LS process also uses bit position exchange, an exclusive logical OR between the PC-1 and LS processed and transformed cipher key KX2PC1LS and PC-1 and LS processed disturbance data X2PC1LS can generate a correct LS processed cipher key. Since the LS process also uses the disturbance data and the data of the cipher key actually processed is different from the original cipher key, it is difficult to presume the cipher key even if the current wave shape is monitored.

The PC-2 process executes a reduction permutation for changing the 56-bit data generated by the LS process to 48-bit data in accordance with a PC-2 table. At 1402, the PC-1 and LS processed and transformed cipher key KX2PC1LS is subjected to the PC-2 process to generate a PC-1, LS and PC-2 processed and transformed cipher key KX2PC1LSPC2. At 1403, the PC-1 and LS processed disturbance data X2PC1LS is subjected to the PC-2 process to generate a PC-1, LS and PC-2 processed disturbance data X2PC1LSPC2. Basically, this PC-2 process uses the table for permutation so that it is fundamentally the same as the PC-1 process.

Next, the process for the f function 903 will be described. As shown in FIG. 10, the f function includes a selectable permutation E process (1002), an exclusive logical OR (1003) between a cipher key and an execution result of selectable permutation, an S box process (1004), and a P permutation process (1005).

Figure 16:
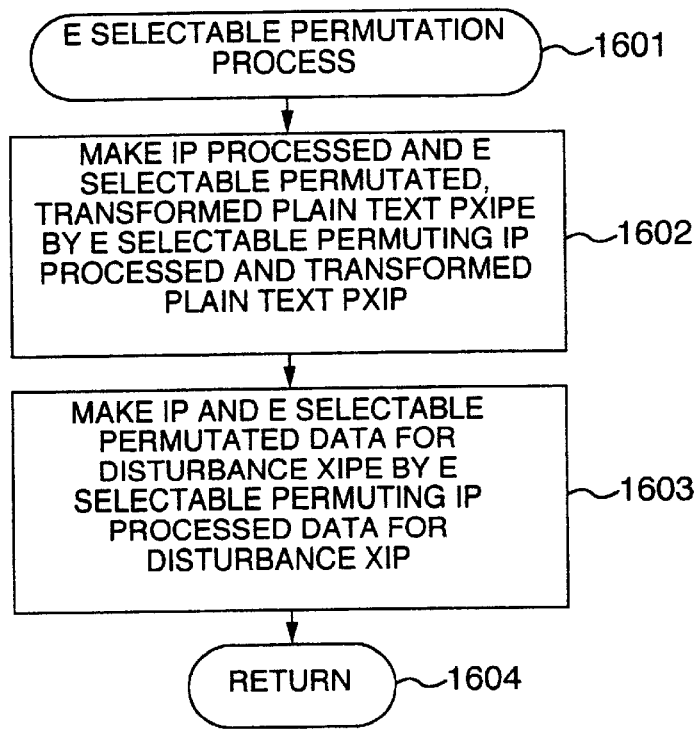
FIG. 16 is a diagram illustrating a selectable permutation E process, according to an embodiment of the invention.

The selectable permutation E process will be described with reference to FIG. 16. Similar to the IP process, the selectable permutation E process exchanges the order of bits by using a permutation table shown in FIG. 28. At 1602 the IP processed and transformed plain text PXIP is subjected to the selectable permutation E process to generate an IP processed, E permutated and transformed plain text PXIPE. At 1603 the IP processed disturbance data XIP is subjected to the selectable permutation E process to generate an IP processed, E permutated disturbance data XIPE. Similar to the IP process and PC-1 process, an exclusive logical OR between the IP processed, E permutated and transformed plain text PXIPE and IP processed, E permutated disturbance data XIPE can generate a correct IP processed, E permutated plain text. Since the values of bits exchanged by using the permutation E table are different from those of original bits, it is difficult to presume the correct data even if the current wave shape is monitored during this process.

Figure 17:
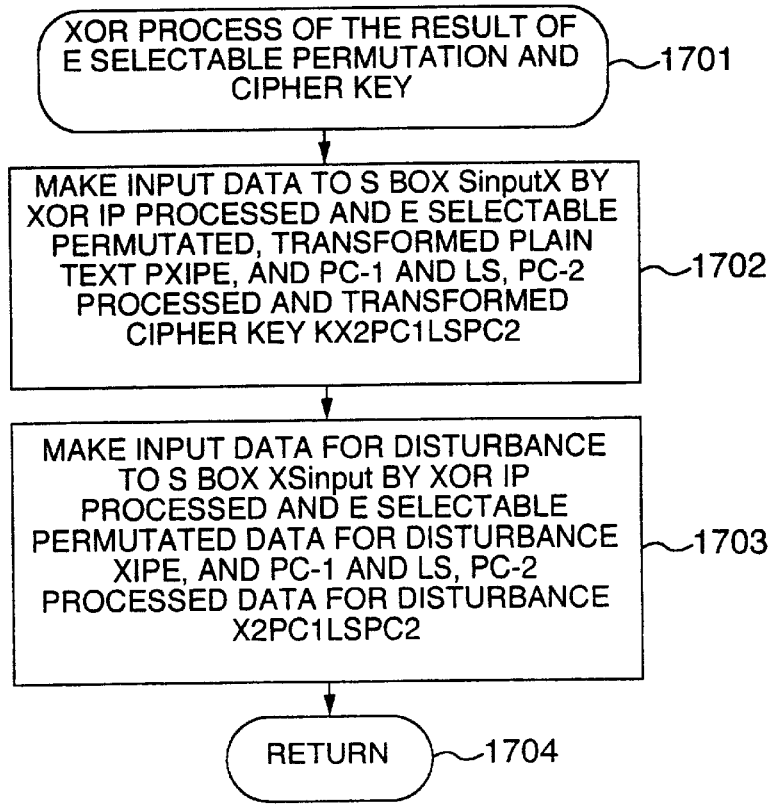
FIG. 17 is a diagram illustrating an XOR process between a result of the selectable permutation E process and a cipher key, according to an embodiment of the invention.

Next, the second process (1003) of the f function, i.e., an exclusive logical OR between the cipher key and an execution result of selectable permutation, will be described with reference to FIG. 17. At 1702 an XOR is calculated between the IP processed, E permutated and transformed plain text PXIPE generated from the plain text and the PC-1, LS and PC-2 processed and transformed cipher key KX2PC1LSPC2 generated from the cipher key to generate 48-bit S box input data SinputX which is used as an input for the S box process. Next, at 1703 an XOR is calculated between the IP processed, E permutated disturbance data XIPE generated from the disturbance data for the plain text and the PC-1, LS and PC-2 processed disturbance data X2PC1LSPC2 generated from the disturbance data for the cipher key to generate S box input data disturbance data XSinput which is used as the disturbance data for the S box input data SinputX. Basing upon the characteristics of an exclusive logical OR, the S box input data disturbance data XSinput can be generated by an XOR between the two sets of disturbance data (the IP processed, E permutated disturbance data XIPE and the PC-1, LS and PC-2 processed disturbance data X2PC1LSPC2). This will be clarified by using a simple example. A plain text is represented by P, a cipher key is represented by K, a transformed plain text is represented by PX1, and a transformed cipher key is represented by KX2. The relations among them are given by the following equations (63) and (64) where X1 and X2 are disturbance data for the plain text and cipher key, respectively:

$$PX1 = P \text{ xor } X1 \quad (63)$$

$$KX2 = K \text{ xor } X2 \quad (64)$$

If an execution result of the exclusive logical OR between P and K is represented by Z, then the relation between Z and an execution result Z1 of the exclusive logical OR between PX1 and PX2 is given by:

$$Z = P \text{ xor } K \quad (65)$$

$$\begin{aligned} Z1 &= PX1 \text{ xor } KX2 & (66) \\ &= (P \text{ xor } X1) \text{ xor } (K \text{ xor } X2) \\ &= P \text{ xor } X1 \text{ xor } K \text{ xor } X2 \\ &= (P \text{ xor } K) \text{ xor } (X1 \text{ xor } X2) \\ &= Z \text{ xor } (X1 \text{ xor } X2) \end{aligned}$$

It can be understood from the above equation that as the disturbance data for recovering the correct data of Z1, the exclusive logical OR between P and K disturbance data can be used. In the exclusive logical OR process between the cipher key and the execution result of selectable permutation, the S box input data disturbance data XSinput can be used as the disturbance data for the S box input data SinputX, the S box input data disturbance data XSinput being generated by an XOR between the IP processed, E permutated disturbance data XIPE generated from the disturbance data for the plain text and the PC-1, LS and PC-2 processed disturbance data X2PC1LSPC2 generated from the disturbance data for the cipher key.

Figure 18:
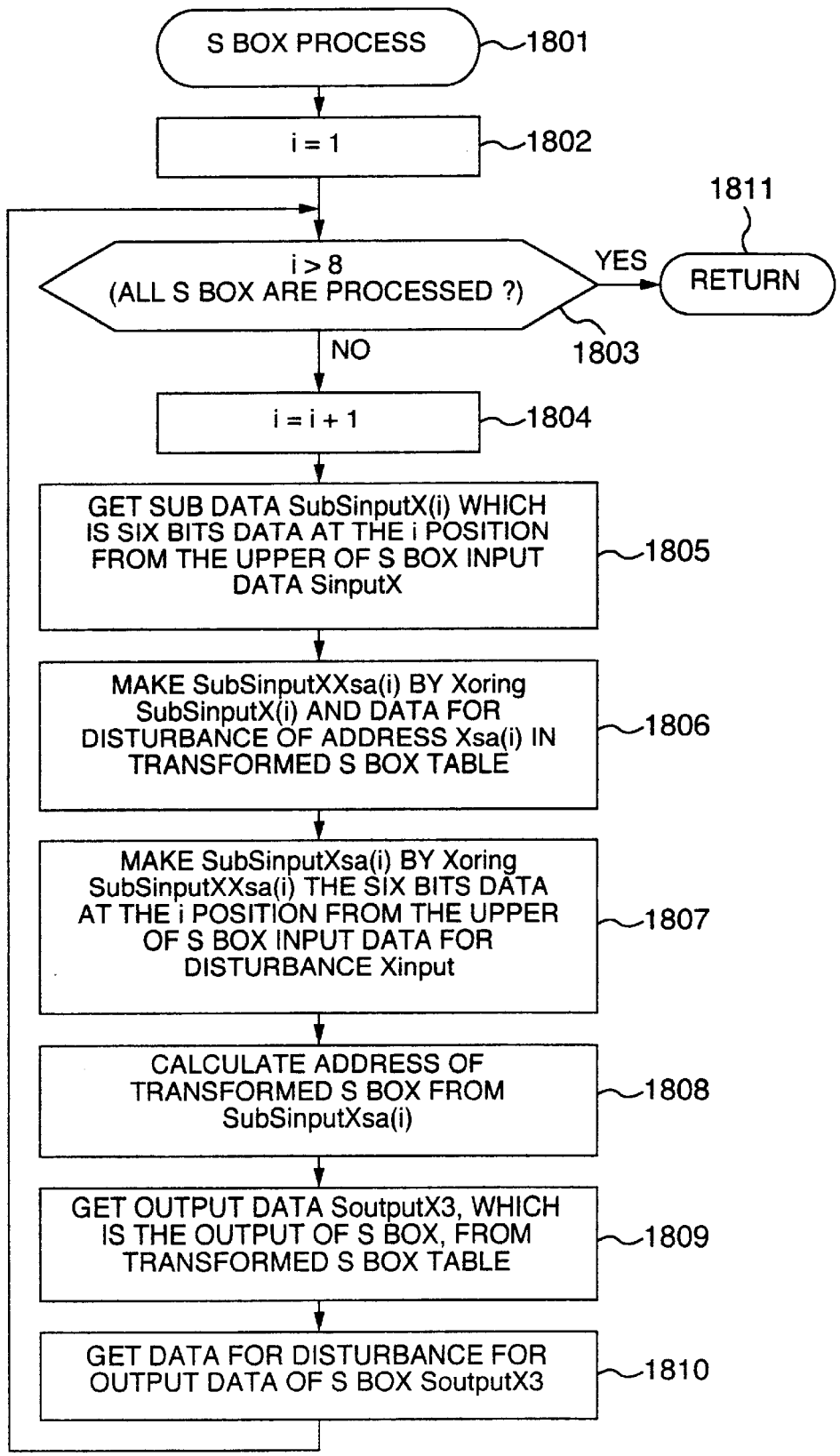
FIG. 18 is a diagram illustrating an S box process, according to an embodiment of the invention.

Next, the S box process will be described with reference to FIG. 18. Eight S boxes are formed each being constituted of 6 bits of the S box input data SinputX. The first S box used in DES is shown in FIG. 25. Although the format of each of the eight S box is the same, the data in each field is different. In the S box process for each S box, first the sub-data SubSinputX(i) of 6 bits is derived from the S box input data Sinput at the upper i-th (1805). An XOR is calculated between this SubSinputX(i) and address disturbance data Xsa(i) for an S box table transformed in advance from the S box, to generate SubSinputXXsa(i) (1806). An XOR is calculated between this SubSinputXXsa(i) and six bits of the S box input data disturbance data XSinput at the upper i-th, to generate SubSinputXsa(i) (1807). This SubSinputXsa(i) is the XORed data of the address disturbance data Xsa(i) and the correct address data to be used for deriving the i-th S box. Since the exclusive logical OR (XOR) between SubSinputX(i) and XSinput(i) recovers correct data, an XOR between SubSinputX(i) and Xsa(i) is calculated and the XOR between the result and XSinput(i) is calculated. With this method, it is not necessary to process the original data so that the original data is difficult to be presumed from the current wave shape. Next, an address of the transformed S box table is calculated by using SubSinputXsa(i) (1808). Since the address for accessing the original S box table is transformed, it is also necessary to transform the table. By using the calculated address, S box output data SoutX3(i) is retrieved from the transformed S box table S(i) (1809). At the same time, disturbance data X3(i) for the S box output data SoutputX3(i) is retrieved (1810). After the eight S boxes are processed, data of SoutputX3(i) and X3(i) for i=1 to 8 is connected together to generate SoutputX3 and X3. SoutputX3 is used as the process data and X1 is used as the disturbance data in the succeeding processes.

Figure 23:
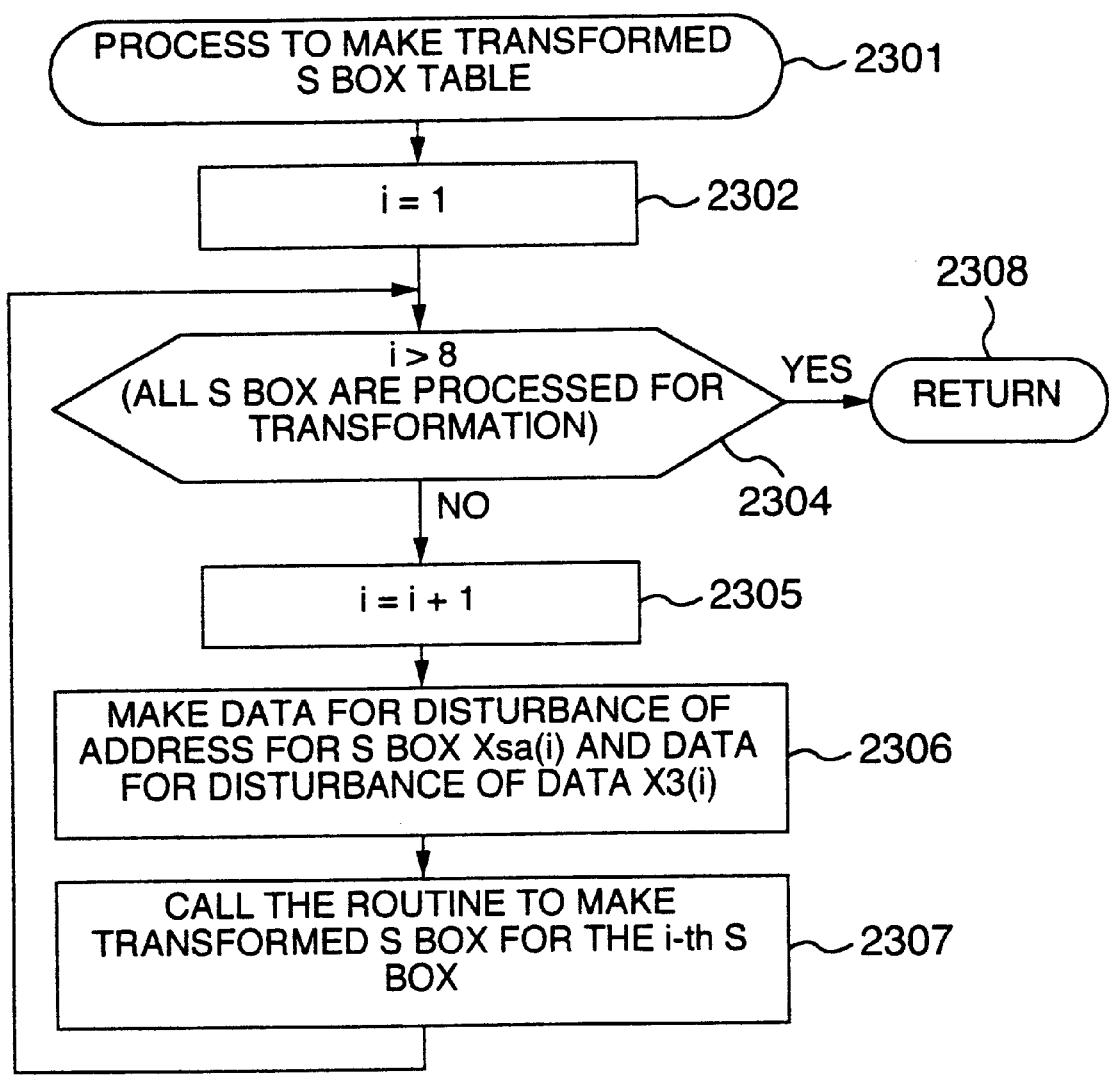
FIG. 23 is a diagram illustrating a process of forming a transformed S box table, according to an embodiment of the invention.
Figure 24:
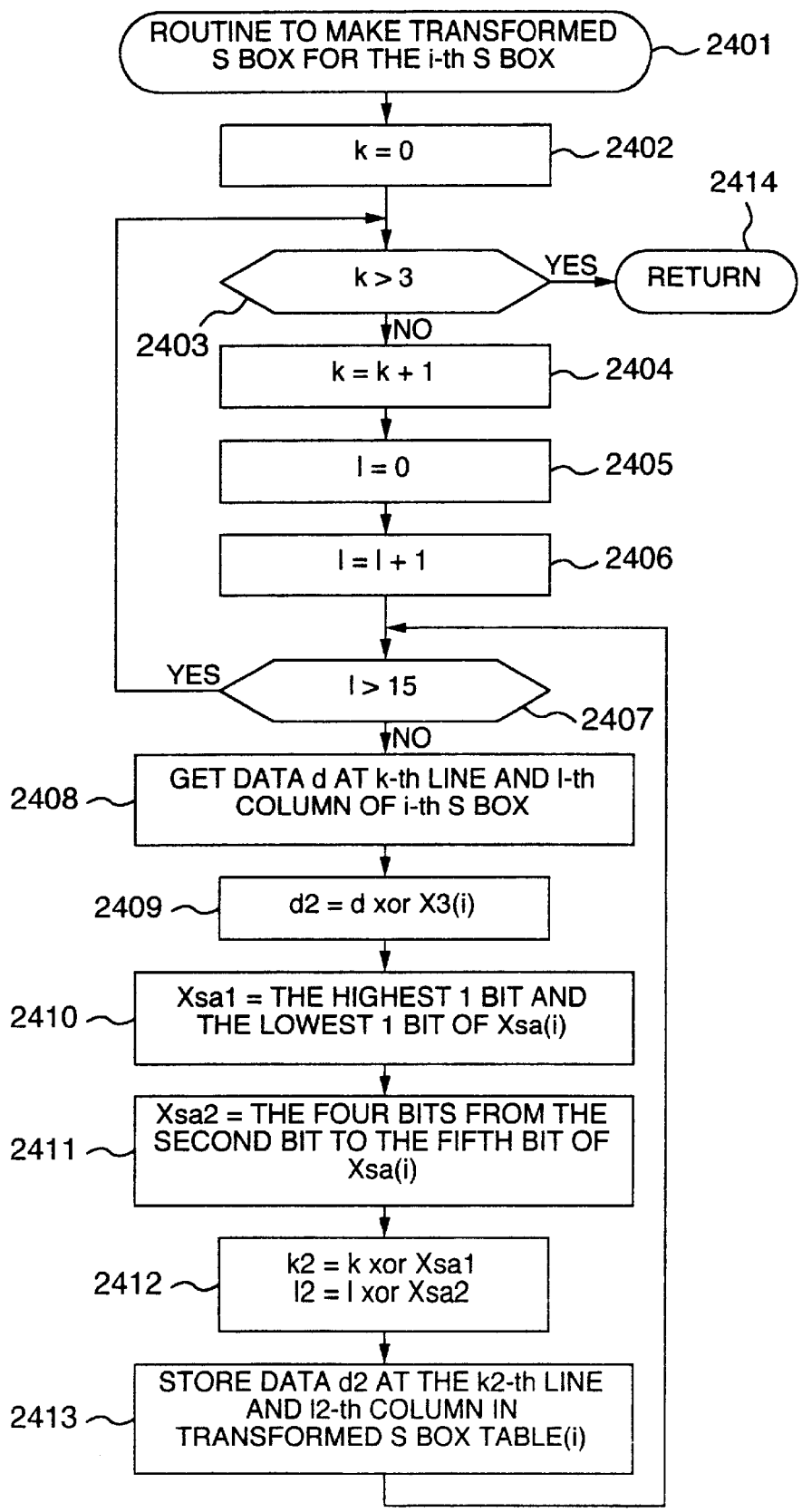
FIG. 24 is a diagram illustrating an i-th transformed S box table forming routine, according to an embodiment of the invention.

Next, a method of generating the transformed S box table will be described with reference to FIGS. 23 and 24. Address disturbance data Xsa(i) and data disturbance data X3(i) are generated from an S(i) box (2306). Xsa(i) has 6 bits and X3(i) has 4 bits. The disturbance data X3 has 32 bits collected from eight X3(i) each having 4 bits. Next, a transformed S(i) box table forming routine is called (2307). The i-th transformed S box table forming routine will be described with reference to FIG. 24, k is used for designating a row number, and l is used for designating a column number. The process for the k-th row and l-th column is illustrated from 2408 to 2413. The first S box table is shown in FIG. 25. First, data d at the k-th row and l-th column is picked up from the i-th original S box (2408). An exclusive logical OR between the data d and the disturbance data X3(i) is calculated to generate data d2 (2409). If the disturbance data is "7", the transformed data of the original S box data at 2504 is indicated at 2604. This operation is executed for all the fields to obtain a transformed S box table shown in FIG. 26. This table shown in FIG. 26 is formed through exclusive logical OR operations between the first S box data and the disturbance data "7".

Next, the address is disturbed. First, Xsa1 is formed from two bits including the upper first bit and the lower first bit of Xsa(i), and Xsa2 is formed from four bits including the bits from the upper second bit to upper fifth bit of Xsa(i). This process is originated from the S box address calculation method. By representing the row and column numbers of the table shown in FIG. 26 by k and l, exclusive logical OR operations between the Xsa1 and Xsa2 for respective row and column are executed (2412). By representing the new row and column numbers by k2 and l2, the data d2 is stored in the i-th transformed S box table S(i) at the k2-th row and l2-th column (2413). An example of this process is illustrated in FIG. 27. The table shown in FIG. 27 is formed by using disturbance data "2" and "9" for the row and column shown in FIG. 26. In this table, for the simplicity purpose, the position of data at each row and each column is not changed and only the row and column numbers are changed. The data "12" indicated at 2504 at the third row and first column of the table shown in FIG. 25 is moved to the first row and eighth column in FIG. 27 and its value is changed to "11". In this example, the data-disturbance data is 7", and the address disturbance data has the row number of "2" and the column number of "9". In this manner, the eight S boxes are transformed. In this embodiment, this process is executed at the first stage of DES. The transformed S boxes are used at sixteen stages of DES.

Figure 19:
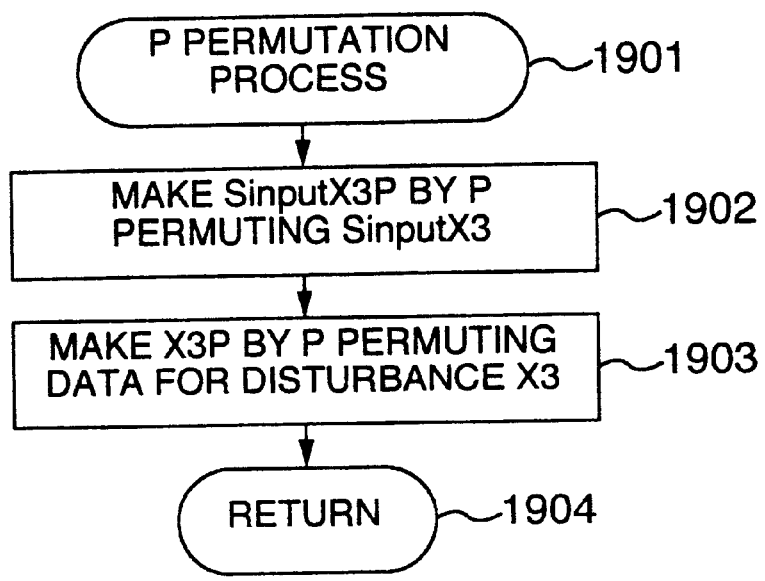
FIG. 19 is a diagram illustrating a permutation P process, according to an embodiment of the invention.
Figure 20:
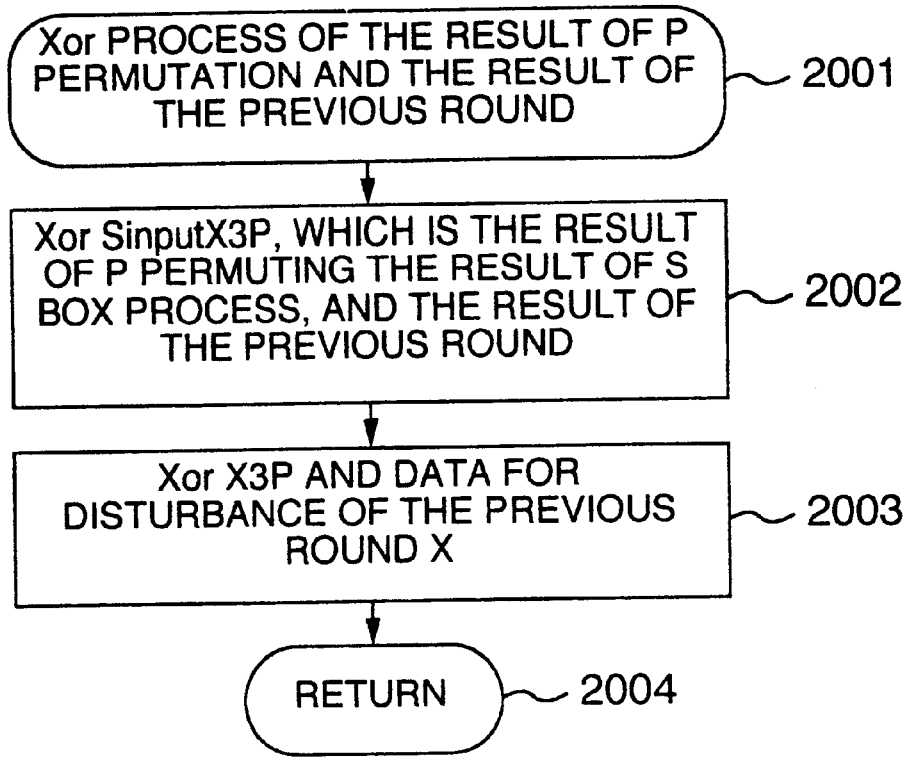
FIG. 20 is a diagram illustrating an XOR process between a result of the permutation P process and a result at the preceding stage.

After the S box process, 32-bit SoutputX3 is used as process data and 32-bit X3 is used as disturbance data, which are supplied to the permutation P process (1005) which is the last process of the f function. The permutation P process will be described with reference to FIG. 19. SinputX3 supplied from the S box process is subjected to the permutation P process to generate SinputX3P (1902). The disturbance data X3 for SinputX3 is subjected to the permutation P process to generate X3P (1903). A table used for the permutation P process is shown in FIG. 29. This table is used in a similar manner to that of the IP process table.

After the f function process is completed, an XOR between a result of the permutation P process and a result at the preceding stage is calculated (909, 914). Specifically, an XOR is calculated between SinputX3P obtained by the permutation P process for the S box process result and a result at the preceding stage (2002). An XOR is calculated between X3P and the disturbance data X at the preceding stage (2003). This XOR process is the same as that (1701) between the selectable permutation E process result and the cipher key.

Figure 21:
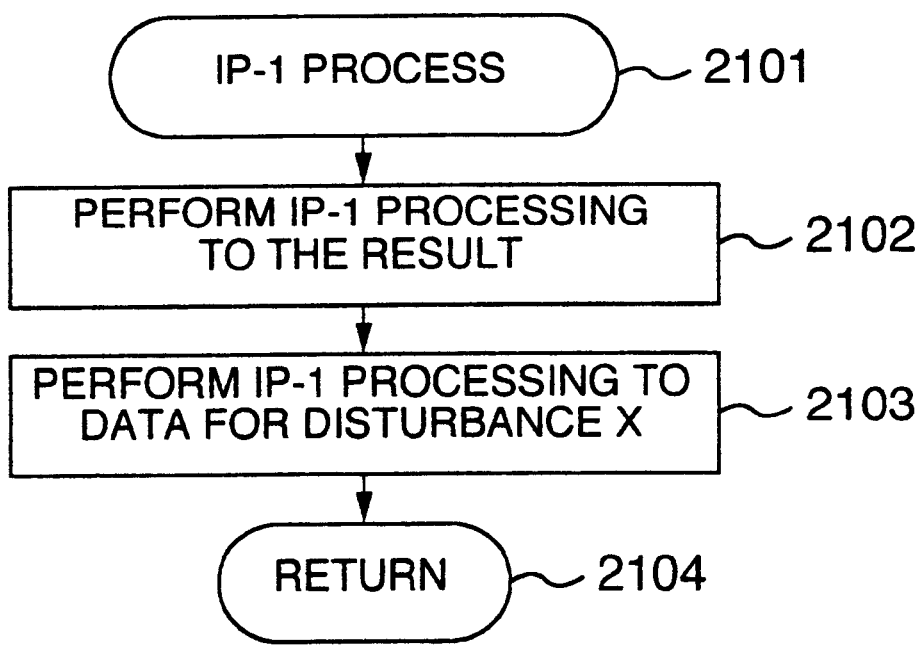
FIG. 21 is a diagram illustrating an IP-1 process, according to an embodiment of the invention.

In DES, the IP$^{-1}$ process (915) is executed at the last stage. This process is illustrated in FIG. 21. The IP-1 process is a bit position exchange process similar to the IP process, and uses an IP-1 table instead of the IP table (2102). The process result obtained by the above-described processes is subjected to the IP-1 process, and the disturbance data X is also subjected to the IP-1 process (2103).

Figure 22:
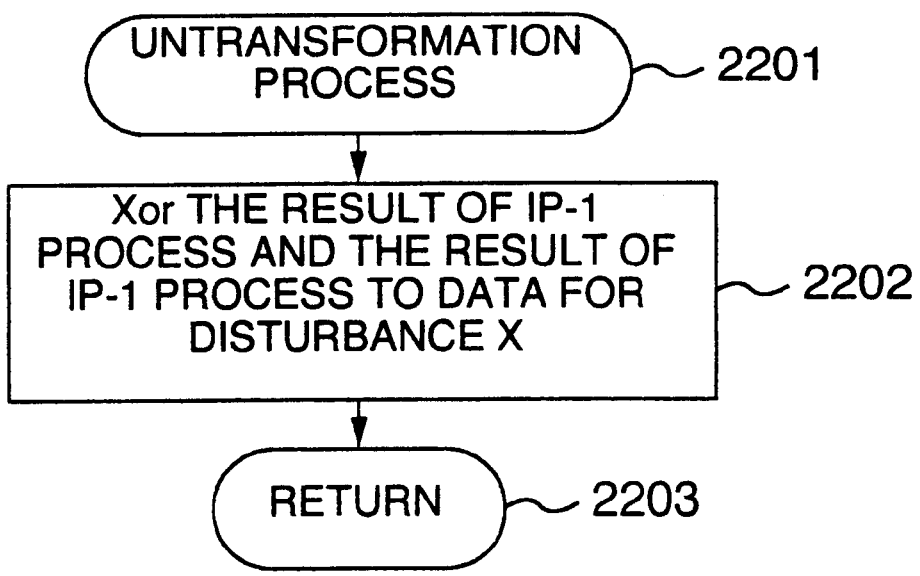
FIG. 22 is a diagram illustrating an untransforming process, according to an embodiment of the invention.

Lastly, in order to recover the correct process result, the untransforming process is executed (916) which is illustrated in FIG. 22. An XOR between the IP-1 process result and the IP-1 processed disturbance data X generates a correct result. The correct process result not transformed can be obtained at the first time at this stage.

Figure 30:
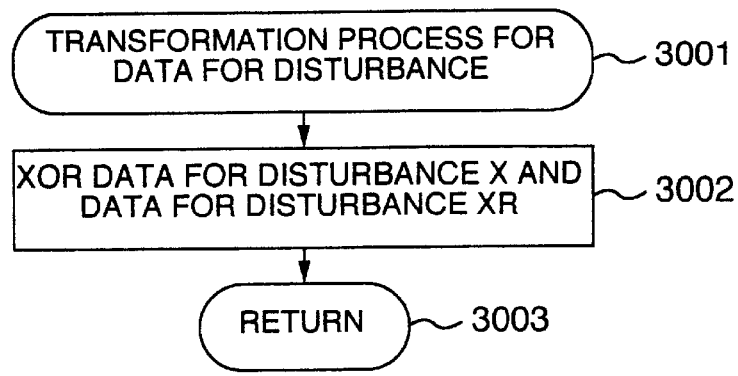
FIG. 30 is a diagram illustrating an encryption process for disturbance data, according to an embodiment of the invention.
Figure 31:
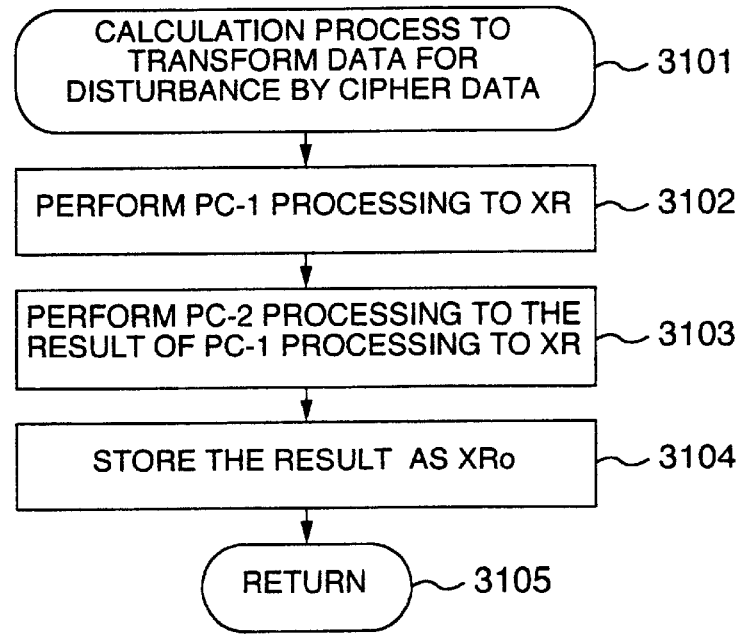
FIG. 31 is a diagram illustrating a transforming calculation process for encryption data for disturbance data, according to an embodiment of the invention.
Figure 32:
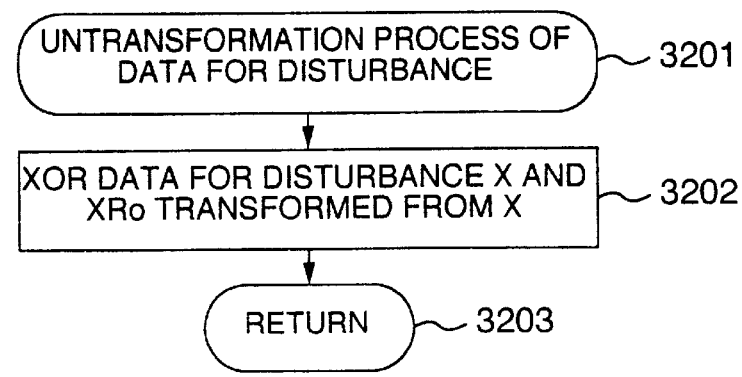
FIG. 32 is a diagram illustrating a decryption process for disturbance data, according to an embodiment of the invention.

To conceal the process data has been described above. There is the case that the disturbance data is also required to be concealed. The fundamental concept is to transform the disturbance data through an exclusive logical OR between the disturbance data and disturbance data XR for disturbance. In this case, XR is fixed and XRo for the untransformation is obtained in advance by calculating bit position exchange or the like. When the disturbance data becomes necessary, the original disturbance data is obtained by using XRo. First, this process will be described by taking disturbance data for the cipher key as an example. The process illustrated in FIG. 30 is a disturbance data transforming process through an exclusive logical OR between the disturbance data for a cipher key and the disturbance data .XR for disturbance. After the transforming process b (3601) generates the disturbance data X2, the disturbance data transforming process shown in FIG. 30 is executed. The disturbance data X2 for the cipher key is subjected to the PC-1 process, LS process and PC-2 process. These processes perform the bit exchange at predetermined bit positions. Therefore, for the predetermined value XR, the disturbance data XRo subjected to the processes up to the PC-2 process is calculated and stored in advance (3102 to 3105). After the PC-2 process, an XOR is calculated (3202) between the PC-1, LS, PC-2 processed disturbance data X2PC1LSPC2 generated at 1403 and the stored disturbance data XRo can generate correct PC-1, LS, PC-2 processed disturbance data X2PC1LSPC2. With these processes, the disturbance data can also be concealed. The same data may be used as the disturbance data XR for disturbance and as the processed, disturbance transformed data XRo.

The embodiments for DES are related to encryption. Since nearly the same DES algorithm is used also for decryption, the embodiments can be applied also to decryption, by hardly modifying the embodiments. Cryptographic algorithms other than DES use many permutation processes, substitution processes and modular calculations. Therefore, the invention can be applied to such algorithms to make it difficult to alter data and presume original data through observation of current wave shapes.

According to the present invention, data to be processed by an IC card chip is transformed so that it is difficult to presume processes and a cipher key through observation of current wave shapes.

What is claimed is:

1. An information processing method comprising:
    a data transforming processing step of transforming input data D1 by using disturbance data Xi to generate transformed data H1;
    a transformed data processing step of executing an operation process OP1 for the transformed data H1, to generate processed and transformed data H2;
    a disturbance data processing step of executing the operation process OP1 for the disturbance data Xi to generate processed disturbance data Xo; and
    a data untransforming processing step of executing an operation process OP2 for the processed and transformed data H2 by using the processed disturbance data Xo, to generate processed data D2 which is a result of the operation process OP1 for the input data D1.

2. An information processing method according to claim 1, further comprising:
    a processed disturbance data storing step of storing the processed disturbance data Xo; and
    a second data untransforming processing step of processing the processed and transformed data by using the stored, processed disturbance data Xo to generate new processed, transformed data.

3. An information processing method according to claim 1, wherein the disturbance data is generated by using a random number.

4. An information processing method according to claim 1, wherein the data transforming processing step performs an exclusive logical OR between the disturbance data Xi and the input data D1, and the data untransforming processing step performs an exclusive logical OR between the process disturbance data Xo and the processed and transformed data H2.

5. An information processing method according to claim 1, wherein the data transforming processing step performs an addition operation between the disturbance data Xi and the input data D1, and the data untransforming processing step performs a subtraction operation between the processed disturbance data Xo and the processed and transformed data H2.

6. An information processing method according to claim 1, wherein the data transforming processing step performs a subtraction operation between the disturbance data Xi and the input data D1, and the data untransforming processing step performs an addition operation between the processed disturbance data Xo and the processed and transformed data H2.

7. An information processing method according to claim 1, wherein the data transforming processing step performs a multiplication operation between the disturbance data Xi and the input data D1, and the data untransforming processing step performs a division operation between the processed disturbance data Xo and the processed and transformed data H2.

8. An information processing method according to claim 1, wherein the data transforming processing step performs a division operation between the disturbance data Xi and the input data D1, and the data untransforming processing step performs a multiplication operation between the processed disturbance data Xo and the processed and transformed data H2.

9. An information processing method according to claim 1, wherein the data transforming processing step regularly changes positions of array data, and the data untransforming processing step accesses the array data changed by the data transforming processing step.

10. An information processing method according to claim 9, wherein the positions of the array data are regularly changed through an exclusive logical OR between an index of the array data and a certain number, an exclusive logical OR between the index of the array data and the number used by the data transforming processing step is used as an index of the transformed data array, and the data untransforming processing step accesses the array data in accordance with the transformed index.

11. An information processing method according to claim 1, wherein the operation process OP1 is a permutation process of exchanging data on a one-bit unit basis, and the data transforming processing step and the data untransforming processing step perform an exclusive logical OR process for the data.

12. An information processing method according to claim 1, wherein the operation process OP1 is a substitution process of exchanging data on a one-byte unit basis, and the data transforming processing step and the data untransforming processing step perform an exclusive logical OR process for the data.

13. An information processing method according to claim 1, wherein the operation process OP1 is a process of exchanging data by using a table, and the data transforming processing step and the data untransforming processing step perform an exclusive logical OR process for the data.

14. An information processing method comprising the steps of:

transforming input data D1 by using disturbance data Xi to generate transformed data H1, without executing a predetermined operation process OP1 for the input data D1 to generate processed data D2;

executing the operation process OP1 or another operation process OP1' different from the operation process OP1 for the transformed data H1 to generated processed and transformed data H2;

executing either the operation process OP1 or the operation process OP1' executed for the transformed data H1, for the disturbance data Xi to generate processed disturbance data Xo; and executing a data untransforming process OP2 for the processed and transformed data H2 by using the processed disturbance data Xo to generate the processed data D2 which is a result of the operation process OP1 for the input data D1.

15. An information processing method comprising the steps of:

transforming input data D1 to generate transformed data H1, without executing a predetermined operation process OP1 for the input data D1 to generate processed data D2; and executing the operation process OP1 or another operation process OP1' different from the operation process OP1 for the transformed data H1 to generate processed and transformed data H2,
  wherein the operation process OP1 is selected so that the processed and transformed data H2 and the processed data D2 become equal.

16. A program on a computer readable medium for processing information, said program including instructions executable by a machine to perform:

a data transforming processing step of transforming input data D1 by using disturbance data Xi to generate transformed data H1;

a transformed data processing step of executing an operation process OP1 for the transformed data H1, to generate processed and transformed data H2;

a disturbance data processing step of executing the operation process OP1 for the disturbance data Xi to generate processed disturbance data Xo; and a data untransforming processing step of executing an operation process OP2 for the processed and transformed data H2 by using the processed disturbance data Xo, to generate processed data D2 which is a result of the operation process OP1 for the input data D1.

17. An IC card including a processor and a memory, wherein the memory stores the program of claim 16, and the processor executes the program.

18. A program storage device readable by a machine, tangibly embodying a program of instructions executable by a machine to perform method steps for processing information, said method steps comprising the steps of claim 1.

* * * * *